United States Patent
Frederick et al.

[11] Patent Number: 5,962,855
[45] Date of Patent: Oct. 5, 1999

[54] MAXIMUM VOLUME RUGGEDIZED SCINTILLATION PACKAGE

[75] Inventors: Larry David Frederick, Huntsville; Larry David Frederick, Jr., Madison, both of Ala.

[73] Assignee: General Electric Co., Wilmington, N.C.

[21] Appl. No.: 09/030,282

[22] Filed: Feb. 25, 1998

Related U.S. Application Data

[63] Continuation-in-part of application No. 08/642,525, May 3, 1996, Pat. No. 5,742,057, and application No. 08/814,908, Mar. 12, 1997, Pat. No. 5,796,109.

[51] Int. Cl.⁶ .................................................. G01T 1/20
[52] U.S. Cl. ........................................ 250/361 R; 250/368
[58] Field of Search .............................. 250/361 R, 368, 250/367, 483.1

[56] References Cited

U.S. PATENT DOCUMENTS

| | | | |
|---|---|---|---|
| 2,902,603 | 9/1959 | Ferre ................................ | 250/71 |
| 2,945,955 | 7/1960 | Mossop et al. ..................... | 250/71.5 |
| 2,949,534 | 8/1960 | Youmans ............................ | 250/71.5 |
| 3,049,630 | 8/1962 | George et al. ...................... | 250/71.5 |
| 3,073,954 | 1/1963 | Carlson et al. ..................... | 250/71.5 |
| 3,950,646 | 4/1976 | Whitlock ............................ | 250/361 |
| 3,960,756 | 6/1976 | Noakes .............................. | 252/301.18 |
| 4,004,151 | 1/1977 | Novak ............................... | 250/485 |
| 4,008,945 | 2/1977 | Schere ............................... | 350/1 |
| 4,063,803 | 12/1977 | Wright et al. ...................... | 350/319 |
| 4,158,773 | 6/1979 | Novak ............................... | 250/361 R |
| 4,275,298 | 6/1981 | Wykes et al. ...................... | 250/255 |
| 4,360,733 | 11/1982 | Novak et al. ...................... | 250/361 R |
| 4,383,175 | 5/1983 | Toepke .............................. | 250/368 |
| 4,666,251 | 5/1987 | Liberman et al. .................. | 350/319 |
| 4,676,817 | 6/1987 | Tailor et al. ....................... | 65/43 |
| 4,764,677 | 8/1988 | Spurney ............................. | 250/361 R |
| 4,833,320 | 5/1989 | Hurlbut .............................. | 250/256 |
| 4,900,937 | 2/1990 | Dayton et al. ..................... | 250/483.1 |
| 4,994,673 | 2/1991 | Perna et al. ....................... | 250/483.1 |
| 5,046,854 | 9/1991 | Weller et al. ...................... | 356/440 |
| 5,047,635 | 9/1991 | Leaney et al. ..................... | 250/256 |
| 5,070,249 | 12/1991 | White ................................ | 250/483.1 |
| 5,087,818 | 2/1992 | Bellian et al. ..................... | 250/361 R |
| 5,120,963 | 6/1992 | Robinson et al. .................. | 250/363.01 |
| 5,132,539 | 7/1992 | Kwasnick et al. ................. | 250/361 R |
| 5,182,791 | 1/1993 | Pollack .............................. | 385/147 |
| 5,264,154 | 11/1993 | Akiyama et al. .................. | 252/301.4 F |
| 5,283,439 | 2/1994 | Bouissou et al. .................. | 250/368 |
| 5,317,158 | 5/1994 | McElhaney et al. ............... | 250/367 |
| 5,332,906 | 7/1994 | Lauf et al. ......................... | 250/483.1 |
| 5,338,937 | 8/1994 | Daghighian et al. ............... | 250/368 |
| 5,397,893 | 3/1995 | Minette ............................. | 250/254 |
| 5,408,097 | 4/1995 | Wraight et al. ................... | 250/256 |
| 5,548,116 | 8/1996 | Pandelisev ........................ | 250/256 |

*Primary Examiner*—Edward P. Westin
*Assistant Examiner*—Richard Hanig
*Attorney, Agent, or Firm*—Donald A. Gregory; Dickstein, Shapiro Nixon & Vanderhye

[57] ABSTRACT

A radiation detector assembly employing an enlarged volume scintillation element and a photomultiplier tube. The scintillation element is surrounded by a reflective material and may be enclosed within a rigid shield for protection against shock and/or humidity. A Sidewall Axial Restraint and Compliance Assembly (SARCA) is positioned radially outside the reflective tape. Radial springs are placed outside the SARCA to provide stiff restraint in the axial and radial directions, The SARCA and springs provide for thermal expansion of the element. A two-stage axial biasing means is positioned at an end of the element, and an optical window may be positioned at the other end. Non-cylindrical portions may be formed along the circumference of the element. These non-cylindrical portions enable a larger element to be placed within the shield. In an alternative embodiment, the element is positioned apart from the photomultiplier tube with no window therebetween. The element is restrained from moving axially toward the photomultiplier tube by a ring attached to the SARCA and fitting in a groove extending around the element, or the element may be in contact with an optical coupler that is bonded to the photomultiplier tube faceplate.

66 Claims, 18 Drawing Sheets

MAXIMUM VOLUME RUGGEDIZED SCINTILLATION PACKAGE

This is a continuation-in-part of U.S. Pat. application Ser. No. 08/642,525 filed May 3, 1996, now U.S. Pat. No. 5,742,057, and U.S. Pat. application Ser. No. 08/814,908 filed Mar. 12, 1997, now U.S. Pat. No. 5,796,109, the entire disclosures of which are incorporated herein by reference.

BACKGROUND OF THE INVENTION

The present invention relates generally to highly ruggedized electro-optical devices for detecting radiation within a harsh environment. More particularly, the present invention relates to a radiation detecting device with a protective shield of standard size and including a scintillation element whose volume has been optimized.

The present invention further relates to a radiation detecting device utilizing numerous elements in combination to provide an effective dynamic suspension system to reduce noise.

Radiation detectors are well known in the drilling industry and are often incorporated into drilling tools for oil wells and the like. Radiation detectors typically include a light detecting and quantifying device, such as a photomultiplier tube, and a scintillation crystal element, or a suitably compounded element. The scintillation element functions by capturing radiation from the formation around a well bore. The radiation may be ambient radiation emitted by radioactive materials in the formation, or radiation emitted in response to bombardment of the formation by radiation sources within the drilling or logging equipment.

A scintillation element responds to gamma radiation by transforming the radiation energy into light energy. The light energy is transmitted through an optical window into a light detecting device, such as a photomultiplier tube. The light impulses are transformed into electrical impulses which are transmitted via a data stream to a computerized instrumentation system.

A radiation detector may be incorporated into a variety of instrumentation and/or control systems where harsh environments exist. The process of well logging the formations in which oil wells are drilled utilizes radiation detectors that are lowered via wireline into the well bores. As the instrument string is rapidly moved through the bore, the detectors are subjected to considerable shock and to temperatures as high as about 200° C. Measurement While Drilling (MWD) or Logging While Drilling (LWD) operations utilize radiation detectors to help evaluate the formations concurrently with the drilling operations and may be used to help guide the drill, thereby subjecting the radiation detector to extreme levels of shock and vibration while also being subjected to temperatures as high as about 175° C. or higher in exceptional cases. Other types of drilling operations, such as for environmental evaluations, geologic evaluations, and support to construction often require similar uses of radiation detectors.

Radiation detectors may also be used in coal mines to detect the boundary between the coal and the formations above and below the coal. Positioning of the detectors on mining equipment, such as continuous miners, near the point where the coal is being removed from the formation subjects the detectors to extreme levels of shock and vibration and above ambient temperatures.

In all the above-noted instances, a highly ruggedized detector is essential so that the detector will not fail and will not produce noise as a result of the shock and vibration.

A major obstacle faced in the design of radiation detector packages relates to the space available to incorporate all the necessary components. Very little space is available in well bores for the placement of radiation detectors, dictating that the detectors be as small as possible. On continuous miners, small detectors are desirable so that they can be strategically located on the machinery for best performance. The need to minimize the size of detector packages is made greater by a trend in the oil drilling industry to utilize smaller diameter drills in cutting well bores. This leads to the need to maximize the use of the space available for radiation detectors.

While it is necessary to have radiation detectors which are small in size, it is imperative that scintillation elements themselves remain as large as possible for at least two reasons. First, a larger cross-section increases the probability that a gamma ray will pass into the scintillation element. Second, a greater thickness of crystal material increases the probability that gamma rays will produce scintillation, rather than just pass through the scintillation element.

Prior art attempts at providing a radiation detector with an efficient scintillation element have not focused on maximizing the size of the element. U.S. Pat. No. 5,241,180 (Ishaque et al.) refers to radiation detectors having a scintillation element with a large end and a smaller end. The large end is nearest the source of radiation, and the element tapers down to the small end positioned near the photomultiplier tube. However, this tapered configuration does not have an optimized volume. Further, this configuration requires a specially constructed detector housing in order to properly house and protect the element from shock.

U.S. Pat. No. 5,614,721 (Pandelisev) refers to a modular gamma camera plate which utilizes scintillation elements of various configurations. However, none of the configurations referred to have an optimized volume. Further, like Ishaque et al., the element of Pandelisev must be housed in a specially constructed housing.

While it is important to maximize the size of a scintillation element, it is necessary to provide a design which effectively protects the scintillation element in a harsh environment. A stiff support system is necessary to maintain a high resonant frequency so that any shock and/or vibration induced displacement of the element will be small. Motion of the element relative to the materials around the element must be kept very small in order to avoid false scintillations which appear as random noise in the data stream and degrade the performance of the detector. In many earlier designs, this noise has been excessive so that the detectors were found to be useless for these extreme environments. This is particularly true when the crystal moves enough to decouple from the window. In addition to providing a high resonant frequency, there must be enough restraining force to prevent the crystal from decoupling during high shock in the axial direction. As the crystal size is made larger within a given sized envelope, less space is available for the support system around the crystal, making it more difficult to incorporate the desired dynamic stiffness and restraining forces. The present invention provides a significant increase in volume of the scintillation element while, at the same time, provides a dynamic support system superior to conventional designs.

Another major complication to designing detectors for the environments described above is the effect of high temperatures. Providing a stiff dynamic support system can produce destructive forces when the scintillation element expands with increasing temperature. This is particularly true when the scintillation element has a high coefficient of thermal expansion, as in the case when the element is made from sodium iodide. Sodium iodide has a coefficient of thermal expansion that is high compared with the metals required for a hermetically sealed shield around the element. Similarly, a high restraining force placed on the crystal in order to keep the crystal from decoupling from the window may combine with other forces that will result in breaking the crystal, breaking the window, or degrading the support elements, which then results in noise or breakage. The present invention provides more effective compliance with thermal expansion while simultaneously providing larger volume, high dynamic stiffness and high restraining forces.

Prior art attempts at providing a radiation detector which operates with minimal noise have been unsuccessful. U.S. Pat. No. 4,900,937 (Dayton et al.) utilizes a weak biasing spring at the non-window end of a scintillation crystal. The spring exerts a force no greater than one hundred fifty times the weight of the scintillation crystal and provides no other significant restraining force in the axial direction. Due to this weak biasing force, the crystal is allowed to decouple from the window in response to shock forces on the detector in the axial direction. Such decoupling causes noise. The noise is introduced into the data stream being transmitted from the photomultiplier tube to the instrumentation system, degrading the performance of the system. A design which allows for decoupling of the scintillation element from the window requires that the radial forces by the sidewalls be weak, such that the element will be able to move back from the window and optical coupler under high shock. Such a radial support may not be stiff enough to provide the high resonant frequency required to sufficiently constrain motion in the radial direction to prevent noise.

U.S. Pat. Nos. 4,004,151 (Novak), 4,360,733 (Novak et al.), 4,383,175 (Toepke) and 4,764,677 (Spurney) all utilize a biasing means at the non-window end of the crystal which provides a strong biasing force to prevent decoupling of the crystal from the window.

Problems arise from the use of a strong biasing means directed toward the window from a single location, namely the non-window end of the crystal. This is particularly true if the window is made from glass or materials that are no stronger than glass. If such high forces are provided by a stiff spring alone, the forces at high temperatures, particularly when combined with high shock, may break the scintillation element or the window. If a softer spring is used but is highly compressed in order to produce the high biasing force, it will not provide the high stiffness required to maintain a high resonant frequency.

In addition, the magnitude of the biasing force is of lesser importance than the overall effective dynamic stiffness of the detector package. The prior art has not provided a scintillation detector package which has an effective dynamic stiffness capable of creating a high resonant frequency, and thus minimized noise, for the package.

SUMMARY OF THE INVENTION

The problems of the prior art are overcome to a great extent by the present invention, which relates to a radiation detector with enlarged means for receiving and transforming radiation into light impulses within a protective shield, both of which are placed within a housing of standard size. More specifically, the present invention is directed to increasing the volume of a scintillation element by increasing its diameter, or length, or both, while still maintaining the same overall diameter for the radiation detector into which the enlarged scintillation element is placed.

For example, a typical configuration in the MWD/LWD industry would be to provide a scintillation element having a diameter of 1.0 inch in a shield having an outside diameter of approximately 1.25 inches. The wall thickness of the shield would typically be 0.035 inches thick, leaving approximately 0.180 inches around the crystal for a reflector/support system. The embodiments of the current invention, detailed below, typically allows a larger crystal that is between 1.100 inches and 1.170 inches, depending upon the configuration. A typical improvement is to increase the diameter by 0.125 inches. Provisions have been made for increasing the length of the scintillation element as well.

Further, the present invention relates to a radiation detector having an effective dynamic suspension system which creates a high resonant frequency and provides sufficient restraining forces to minimize noise due to shock and vibration. It also overcomes the problem of providing these needed dynamic properties while providing for compliance with thermal expansion.

The dynamic suspension system and the thermal compliance provided in the present invention enable an increased volume scintillation element to be used in a harsh environment having high shock, vibration and temperature extremes.

The present invention can be effectively used in combination with sapphire windows. Sapphire provides much greater strength than conventional glass, and hence a thin sapphire window can be substituted for a much thicker glass window, allowing for a longer scintillation element. The high strength of sapphire also allows use of higher restraining forces in the package. The invention can also be used effectively with a two stage axial support, which takes up less space than a single stage support, for most configurations, thus allowing for a longer scintillation element. The application of this invention in combination with a sapphire window and a two stage axial support maximizes the scintillation element volume.

In accordance with a preferred embodiment of the present invention, a system is provided for protecting the radiation receiving and transforming means against physical shock and moisture contamination. Included within the radiation detector is a rigid scintillation shield, an optical coupling transparent to light impulses, an end cap and a scintillation detector housing.

In a preferred embodiment, the scintillation element is encased within a protective sleeve. The protective sleeve may be made to have a high degree of thermal compliance in the axial direction by making the sleeve in two layers that are bonded together on the end near the window, having grease between the layers in the un-bonded area. Springs are installed between the housing and the sleeve to provide stiff radial support to the element. The springs also provide relief from thermal expansion of the element in the radial direction. These springs will be referred to throughout as "radial springs". This combination of elements provides frictional forces on the element to prevent axial movement of the element within the housing, while at the same time allowing effective relief from the thermal expansion of the element in the axial direction.

In another preferred embodiment of the invention, the scintillation element is encased within the scintillation shield. The scintillation element is cylindrical with a generally circular cross-section. In order to maximize the diameter of the scintillation element within the space constraints of the detector package, while still providing proper support and protection against shock, grooves or flats are cut along the length of the scintillation element. Shock absorbing means, such as springs or spacers, are positioned between the element and the scintillation shield. The shock absorbing means may be placed within the grooves or flats, between respective grooves or flats, or both.

In another preferred embodiment of the present invention, the scintillation element is encased within a metallic sleeve, which itself is bonded to a force distribution pad. The element, sleeve and force distribution pad are then placed within the housing.

In another preferred embodiment, the scintillation shield is attached directly to a photomultiplier tube faceplate. In this arrangement, the element is optically coupled directly to the photomultiplier tube, with only an optical coupler positioned therebetween.

In another preferred embodiment, the scintillation element is restrained within the scintillation shield at a position such that a void space is created between an end of the scintillation element and an end of the photomultiplier tube. Neither an optical window nor an optical coupler is placed within the radiation detector package.

An object of the present invention is to maximize the volume of a scintillation element for placement within a standard size radiation detector housing.

Another object of the invention is to provide stiff restraints at several positions around the scintillation element to prevent decoupling of the element from the window, while allowing the element to expand due to high temperature.

Another object of the invention is to provide high resonant frequency of the scintillation package in all axes to minimize motion and thereby minimize or eliminate noise from the package.

The above and other objects, advantages and features of the invention will be more readily understood from the following detailed description of the invention which is provided in connection with the accompanying drawings.

DETAILED DESCRIPTION OF PREFERRED EMBODIMENTS

Figure 1:
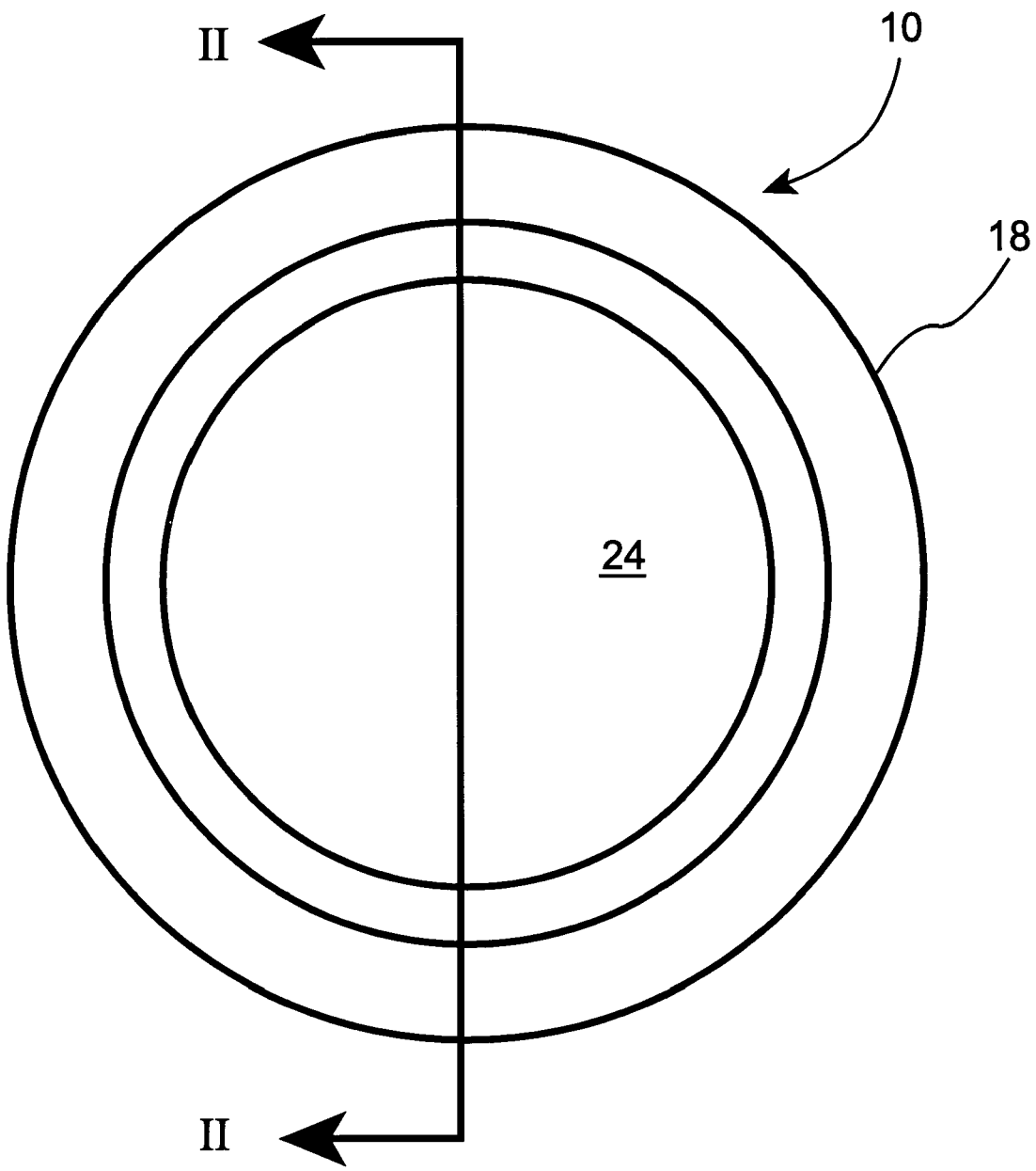
FIG. 1 is an end view of a downhole detector assembly constructed in accordance with a preferred embodiment of the present invention.
Figure 2:
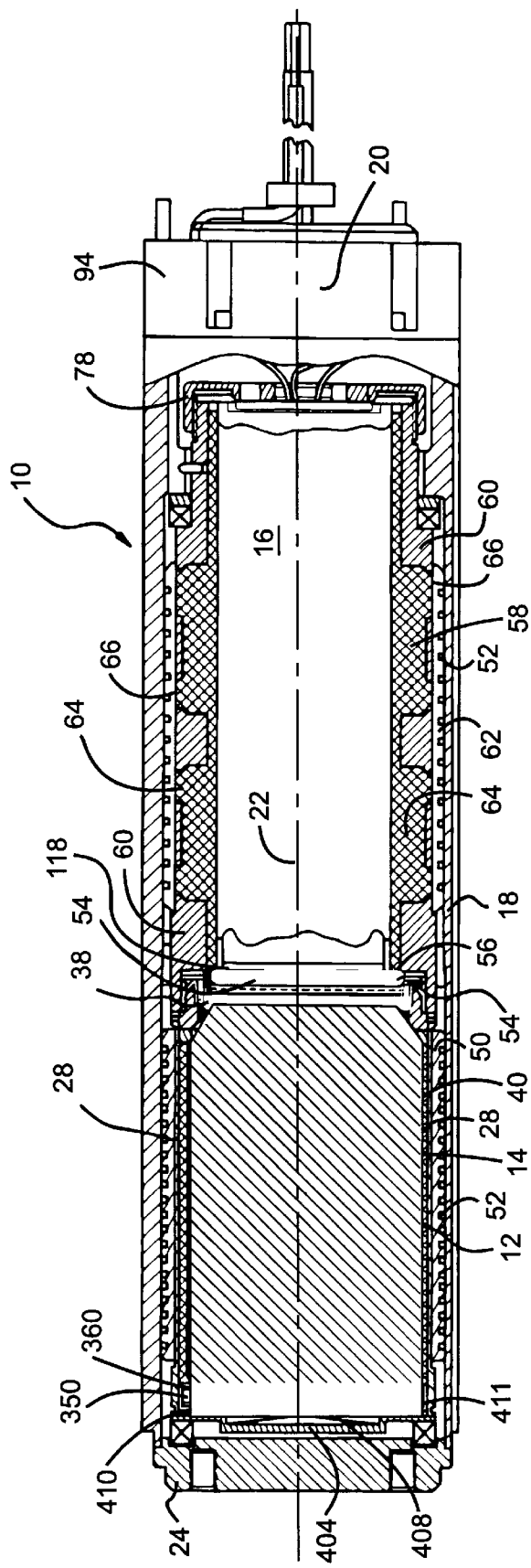
FIG. 2 is a cross-sectional view of the downhole detector assembly of FIG. 1, taken along line II—II.
Figure 3:
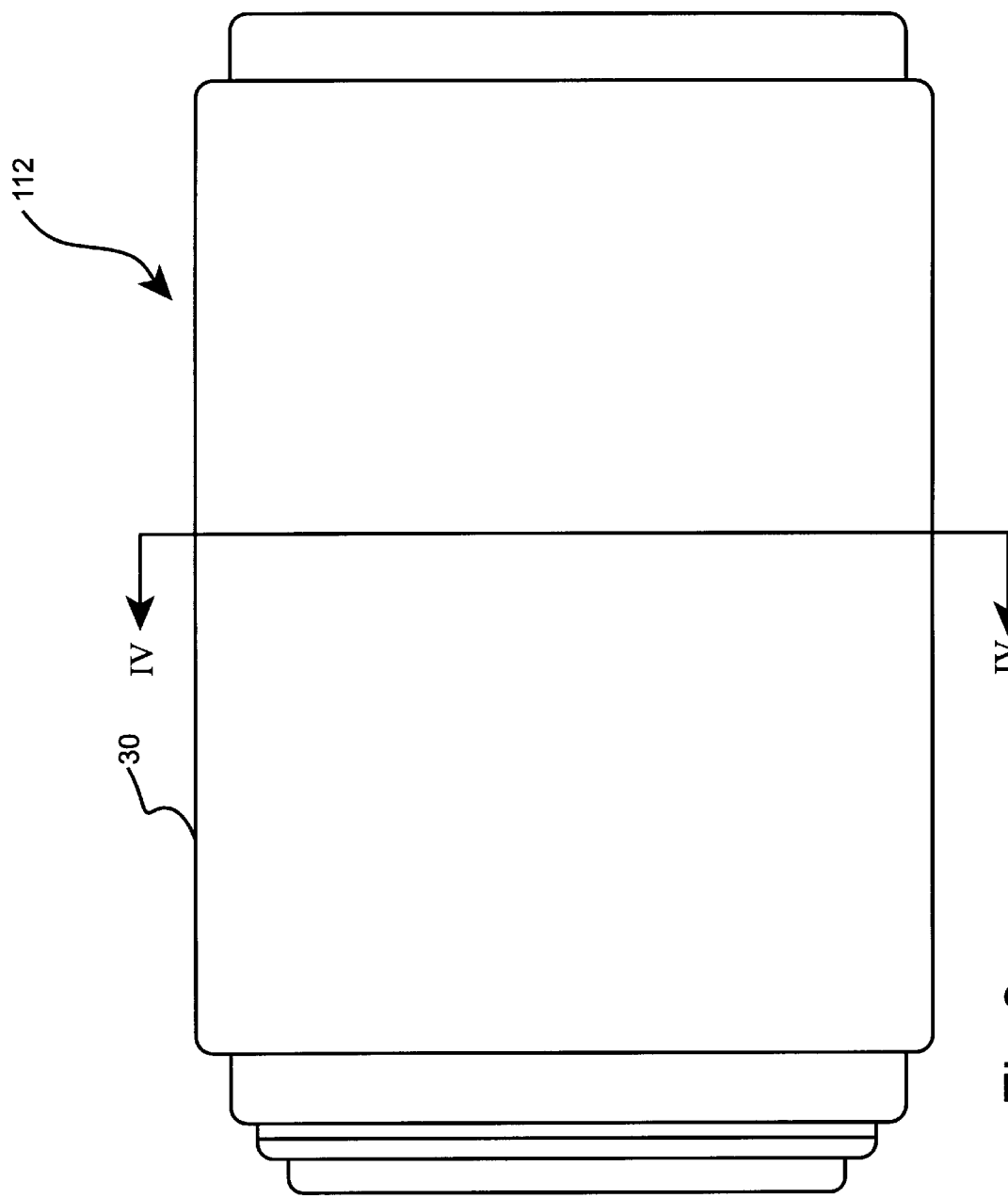
FIG. 3 is a side view of a scintillation package constructed in accordance with a preferred embodiment of the present invention.

Referring now to the drawings, where like reference numerals indicate like elements, there is shown in FIGS. 1 and 2 a unitized radiation detector assembly 10 constructed in accordance with the principles of the present invention. The assembly 10 includes a scintillation package 12, which includes a scintillation element 14, and a photomultiplier tube 16 having a faceplate 118. The package 12 is located within a detector housing 18. It should be understood that the present invention is usable in MWD applications and wireline applications, and continuous miners in coal mines, as well as numerous other applications such as environmental measurements made by drilling into the earth, scientific probes in harsh environments such as on the surface of other planets, and harsh commercial and industrial applications such as nuclear power plants.

The scintillation element 14 is preferably a sodium-iodide (NaI) crystal. Alternatively, the element 14 may be composed of other substances capable of receiving radiation and transforming it into light impulses. Thus, radiation receiving and transforming means includes, in addition to NaI, substances such as anthracene, bismuth germanium oxide (BGO), cerium iodide (CeI), cesium iodide (CsI), gadolinium orthosilicate (GSO), lutetium orthosilicate (LSO), and other like substances.

The element 14 receives radiation from the well bore (not shown), transforms the radiation into light impulses and transmits the light impulses to the photomultiplier tube 16. The photomultiplier tube 16 receives and quantifies the light impulses and transmits information pertaining to the light impulses to an electronic assembly 20 (discussed in more detail below).

All of the elements of the detector assembly 10 are cylindrical or annular and are axially symmetric about a longitudinal axis 22.

The nature of the scintillation package 12 allows for complete refurbishment and/or replacement of the package 12, the scintillation element 14 and the photomultiplier tube 16.

Enclosing one end of the detector assembly 10 is a scintillation element end retainer 24 which is fastened to the housing 18 by a weld. The housing 18 is preferably made of a beryllium-aluminum hybrid material but may be made of any other suitable material, such as titanium or stainless steel.

Figure 17:
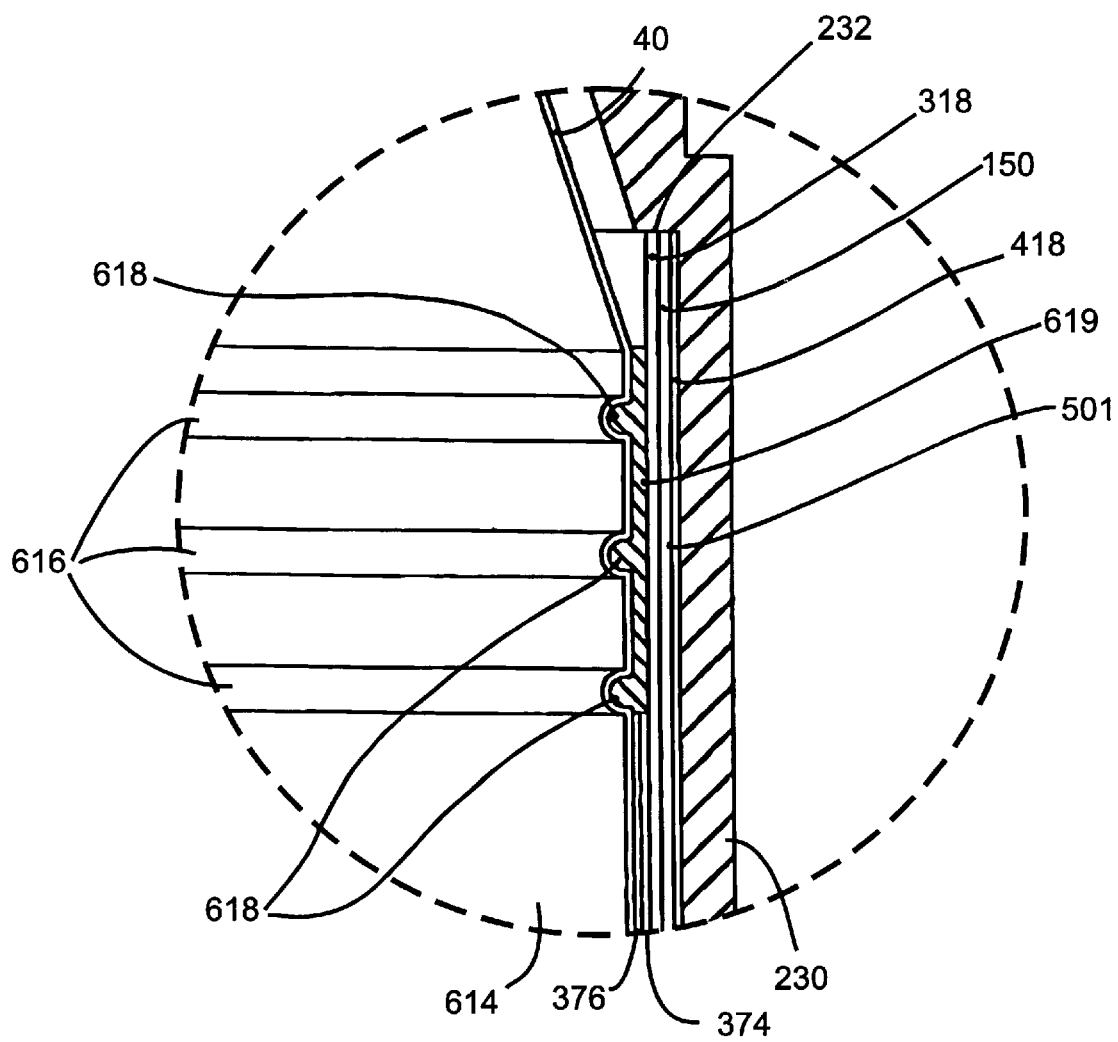
FIG. 17 is an enlarged view of the ridges shown in circle XVII of FIG. 16.

Titanium has a lower attenuation than many metals, including stainless steel, which is the industry standard for MWD and LWD applications. Thus, use of titanium provides lowered attenuation and high strength, while also increasing the space available for a scintillation element. Although aluminum has a lower attenuation than titanium, aluminum is not as strong as titanium. Consequently, thicker aluminum may be required, which increases its attenuation and decreases the amount of space available for an element. The use of titanium also allows for direct bonding of the sapphire window to the housing 18 or shield 30 (described in detail below), making possible the use of larger diameter windows that better match the enlarged element 14 (FIG. 17).

Surrounding the scintillation element 14 is a potting material 28. The material 28 has shock absorbing properties, and may be made of a suitable elastomer. The material 28 may be in powder form. The material 28 is encased within a scintillation shield 30. The shield 30 is open at both ends.

Sandwiched between the scintillation element 14 and an end retainer 404 is a metallic spring 408. The spring 408 is surrounded by an elastomeric pad 410, and thus the spring 408 and pad 410 provide biasing force in parallel from the end retainer 404 toward the element 14.

The metallic spring 408 and the elastomeric pad 410 provide axial support and cushioning for the element 14. In addition, the spring 408 and pad 410 provide room for the scintillation element 14 to expand. The spring 408 and pad 410 provide a pre-load on scintillation element 14 through a circular shim 411 mounted between the spring 408, pad 410 and element 14. The pre-load is distributed across the face of the element 14 by a metallic plate 360. Another elastomeric pad 350 is positioned between the plate 360 and the shim 411. The plate 360 is located between the pad 350 and the element 14.

The elastomeric pad 410 and spring 408 also provide a two-stage loading on the scintillation element 14. The spring 408 is sized to provide a constant minimum force on the scintillation element 14 sufficient to maintain adequate load during sub-ambient conditions.

The elastomeric pad 410, concentric with the metallic spring 408 and disposed outwardly therefrom, is positioned so as to begin assuming load at elevated temperatures. The combination of the spring 408 and the pad 410 allows the scintillation element 14 to deflect the required amount without developing excessive forces while at the same time being assured an adequate pre-load force is present at high temperatures, at ambient temperatures, and at temperatures below ambient.

The amount of the biasing force of the spring 408 and pad 410 combine with the additional axial restraining force supplied radially to provide a given dynamic stiffness to the entire package 12. The total axial restraining force will typically be selected in the range of one hundred and forty to two hundred and fifty times the weight of the scintillation element. These forces will increase by as much as fifty percent to one hundred percent at maximum temperature.

While a spring 408 and a pad 410 are shown, the present invention is not so limited. What the spring 408 and pad 410 provide is a parallel force directed at an end of the element 14, and the force is the combination of parallel forces stemming from biasing means having different properties. For example, the pad 410 might be replaced with a stiff spring or by a thermal compensating device in combination with a pad 410 or spring 408.

More specifically, the spring 408 is sized and shaped and chosen from a type of material so as to have a long draw, which provides a lessened biasing force. This lessened biasing force is useful for perpetuating optical coupling between the element 14 and an optical window (described below). The pad 410 is sized and shaped and chosen for a type of material so as to have a shorter draw, thus providing a stiffer biasing force. This stiffer biasing force creates axial stiffness, which is important to maintain the optical coupling between the element 14 and the optical window during operation.

A reflective tape 40 is wrapped completely around the element 14. The potting material 28 surrounds the reflective tape 40, which may be TEFLON®, and which is preferably white in color. The tape 40 reflects light impulses and enhances their transmission into the photomultiplier tube 16. Although tape 40 is illustrated, it is to be understood that the scope of the invention includes any reflective material which reflects light impulses and enhances the transmission of light impulses to a photomultiplier tube or like device. Specifically, reflective materials may include reflective media presented in strips, sheets or as a sheath, reflective media which is coated or painted on, and reflective material in liquid, powder or granular form.

Sandwiched between the shield 30 and the exterior housing 18 is an annular boot 50. The boot 50 has treads 52 for providing dynamic damping in both the axial and radial directions. The boot 50 and the potting material 28 provide radial cushioning for the scintillation element 14.

The light impulses generated by the scintillation element 14 are transmitted through the transparent elastomeric layer 38, through an optical window 54, then through a transparent elastomeric layer 56 and then into the photomultiplier tube 16. The optical window 54 is made of any suitably transparent material. The window 54 may be made of sapphire. Sapphire is preferred because it is compatible with titanium, has high optical transmissivity, and is very strong. Specifically, titanium and sapphire have similar coefficients of thermal expansion and a titanium shield 30 can be effectively brazed to a sapphire window 54.

The photomultiplier tube 16 is encased within the elastomeric element 58, which is further encased within a photomultiplier tube housing 60. Sandwiched between the housing 60 and the unitized detector housing 18 is an elastomeric boot 62. The boot 62 (like the boot 50 surrounding the scintillation element 14) has treads 52 for providing dynamic damping in both the axial and radial directions.

As a way of centering the photomultiplier tube 16 within the unitized detector housing 18 and to provide radial cushioning for the photomultiplier tube 16, the elastomeric element 58 includes a plurality of outwardly extending projections 64. The photomultiplier tube housing 60 has a plurality of openings 66. The projections 64 fit into the openings 66.

An end retainer 94 is located at the end of the unitized detector assembly 10 farthest from the element 14. The electronics assembly 20 may be located within the retainer 94.

As radiation exits the surrounding well bore formation (not shown) and enters the scintillation element 14, the scintillation element 14 transforms the radiation into light impulses. The light impulses are transmitted through the transparent elastomeric layer 38, the optical window 54, the elastomer layer 56 and into the photomultiplier tube 16. The reflective tape 40 helps to prevent the light impulses from exiting the unitized radiation detector assembly 10 and focuses the light impulses through both optical elastomer layers 38, 56 and the optical window 54 and into the photomultiplier tube 16.

The photomultiplier tube 16 is axially biased toward the optical window 54 by a compression cap 78. This arrangement helps to maintain the position of the photomultiplier tube 16 and optimize the light impulse receiving capabilities of the photomultiplier tube 16. The photomultiplier tube 16 receives and quantifies the light impulses. The photomultiplier tube 16 transmits the ascertained quantity of light impulses to the electronics assembly 20, which further transmits this information to controllers on the ground.

Figure 4:
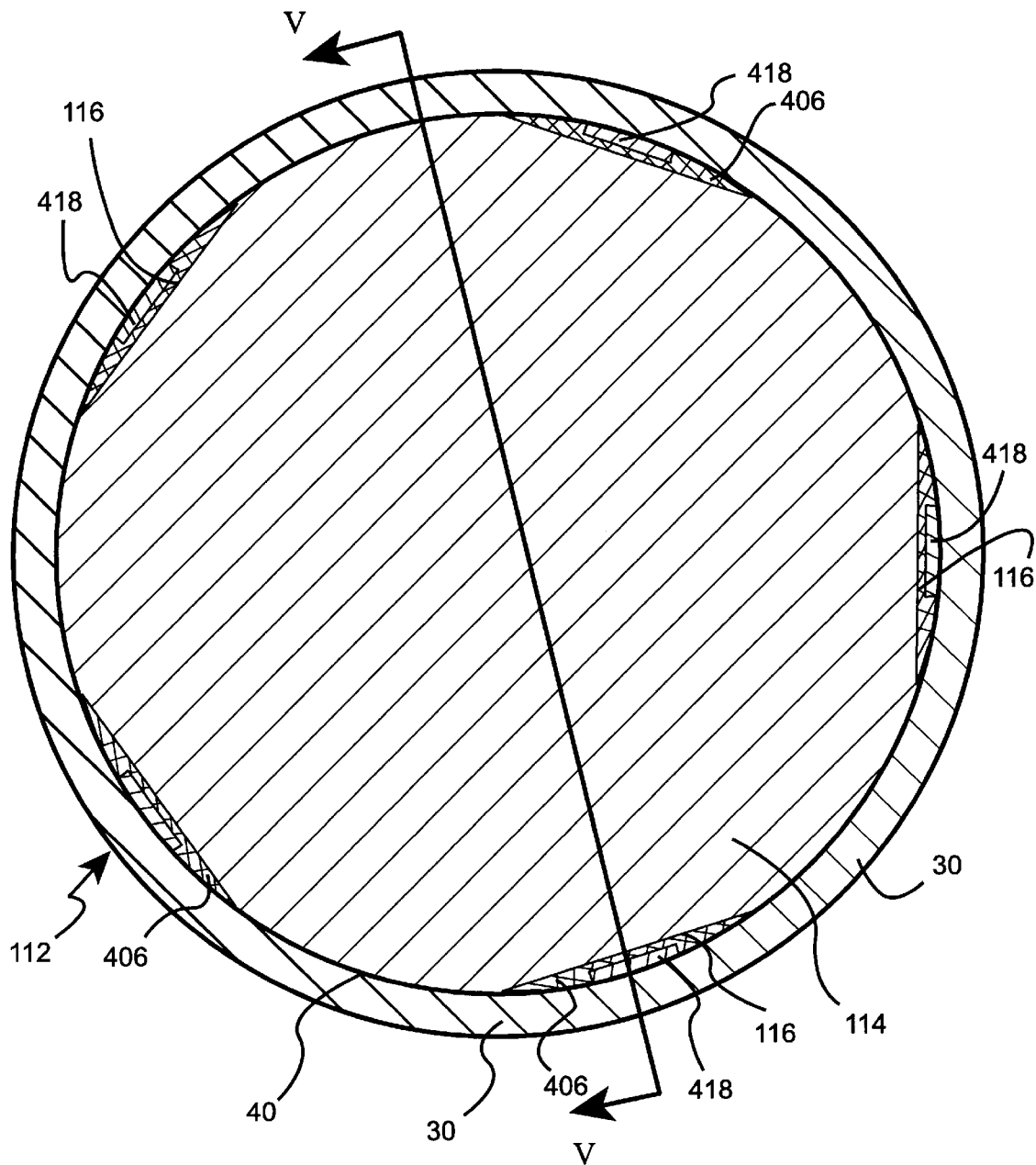
FIG. 4 is a cross-sectional view of the assembly of FIG. 3, taken along the line IV—IV.
Figure 5:
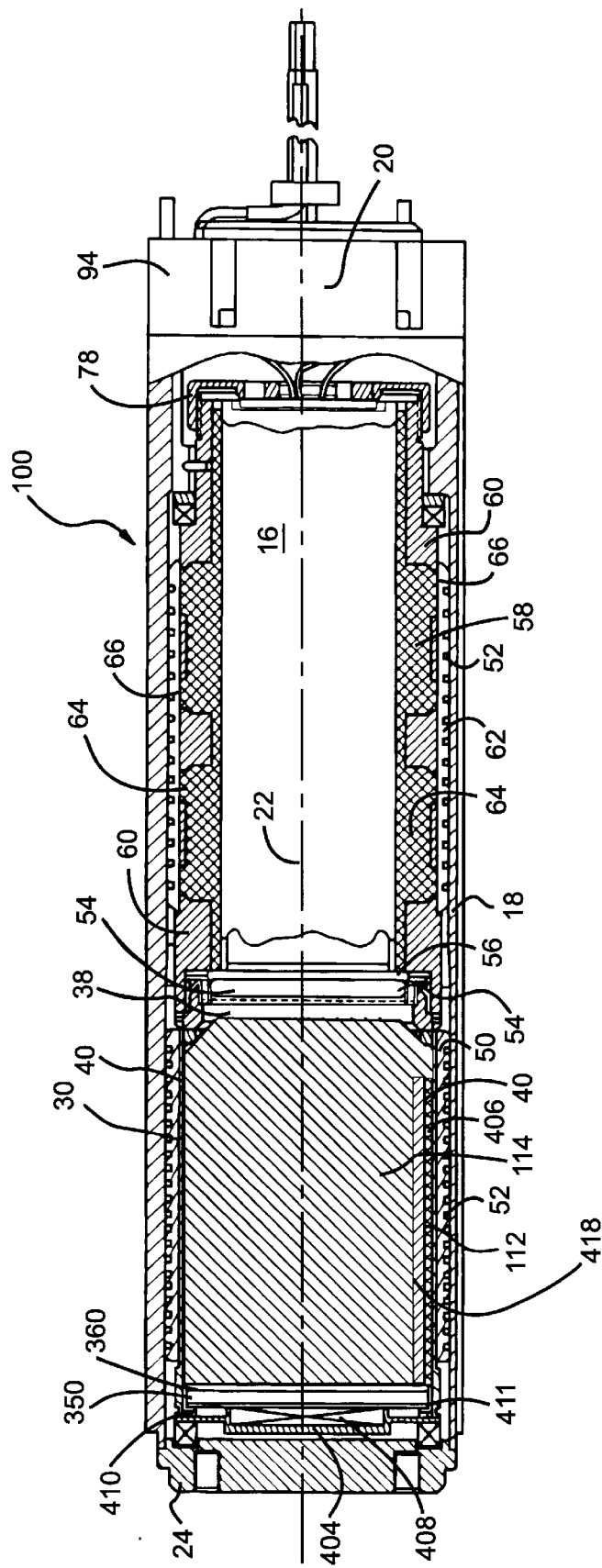
FIG. 5 is a cross-sectional view of the package of FIG. 3 included within the assembly of FIG. 2, taken along the line V—V.

A second embodiment of the present invention, shown in FIGS. 3–6, maximizes the size of the scintillation element within the scintillation package assembly. As shown in FIGS. 4 and 5, a radiation detector assembly 100 includes a scintillation package assembly 112 having a scintillation element 114. Scintillation element 114 is encased within the reflective tape 40 and housed within the scintillation shield 30.

Scintillation element 114 differs from element 14 in that element 114 includes non-cylindrical, flattened portions or flats 116 running almost the entire length, and parallel to the longitudinal axis, of the element 114. A small portion of the element 114 near the window 54 does not include flats 116, so that the element 114 can have the widest possible area at the interface with the window 54. The flats 116 may be formed by paring away portions of the element 114 or by any other suitable method.

Figure 6:
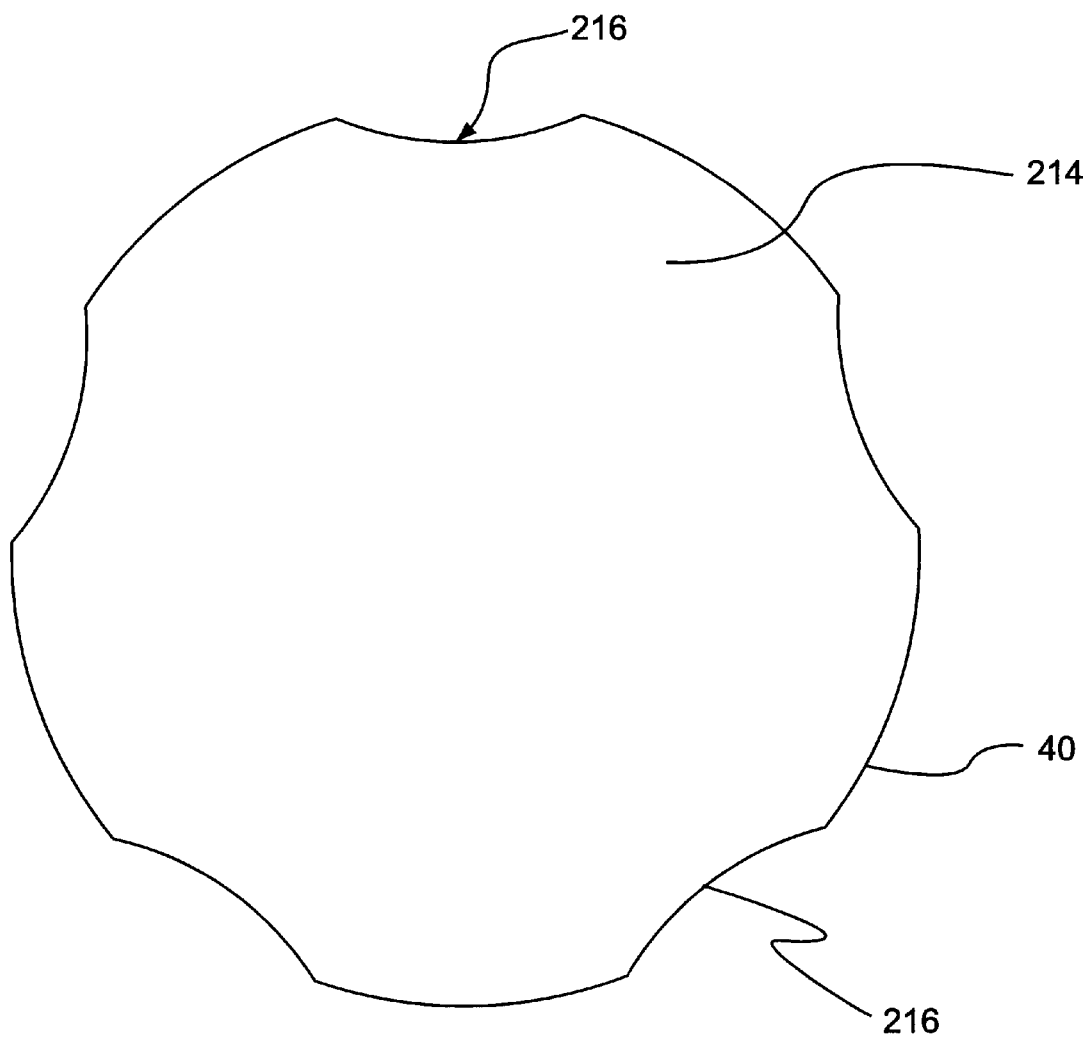
FIG. 6 is an end view of a scintillation element constructed in accordance with another preferred embodiment of the present invention.

Alternatively, with specific reference to FIG. 6, a scintillation element 214 may be used. Element 214 differs from element 114 in that concave grooves 216 are positioned on the element 214 instead of flats 116. The grooves 216 may be formed by any suitable method. Further, although five such flats 116 or grooves 216 are illustrated in FIGS. 3–6, any suitable number of flats 116 or grooves 216 may be employed.

Completely surrounding the element 114 is the reflective tape 40. Partially surrounding the scintillation element 114 is a potting material 406. More specifically, the potting material 406 is positioned roughly along the flats 116. The material 406 has generalized elastomeric properties, and may be made of a suitable elastomer such as silicon or SYLGARD®. The material 406 is sandwiched between the element 114 at flats 116 (or grooves 216 for element 214) and the springs or spacers 418.

Referring now to FIG. 4, a plurality of radial biasing members or springs 418 are installed along the flats 116 after the potting material 406 has set. The springs 418 provide a radial biasing force on the potting material 406 and provide radial positioning for the element 114. The springs 418 may be flat spring steel that is installed flat and becomes arched. In one aspect of the invention, the springs 418 are 0.015 inches thick and 0.125 inches in width. In an alternative embodiment, the springs 418 may be arched spring steel preformed into an arch configuration. Although radial springs 418 are illustrated as being positioned along the flats 116, further springs 418 may be installed between each flat 116 such that the springs 418 will be positioned between the inner surface of the shield 30 and the outer surface of the reflective tape 40.

The springs 418 are stiff and provide high forces to the element 114. The high forces are distributed along the lengths of the springs 418. The stiffness of the springs 418 helps provide a high resonant frequency for the scintillation package 112. The large but uniform forces also provide a significant restraining force in the axial direction.

By providing the flats 116 along the length of the element 114, room is provided for the springs 418 within the shield 30 and surrounding the element 114. Thus, the element 114 can be of greater size than the uncut element 14. In a typical case, the diameter of element 114 can be increased by about 0.125 inches. For an element having an initial diameter of 0.5 inches, this represents a volume increase of more than 50 percent. For an element having an initial diameter of 0.75 inches, this represents an increase of over 30 percent.

Figure 7:
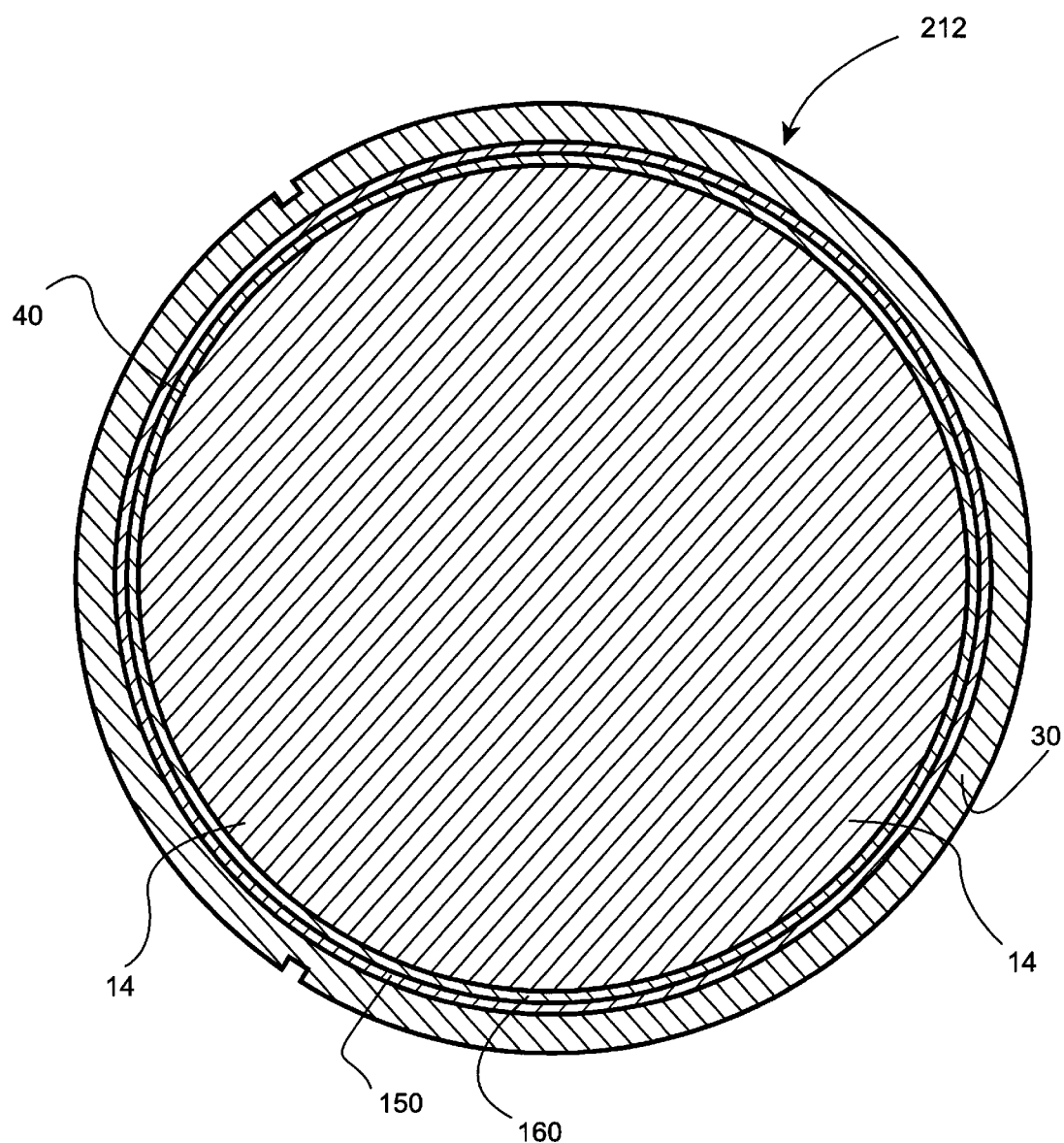
FIG. 7 is a cross-sectional view of a scintillation package constructed in accordance with another preferred embodiment of the present invention.

In an alternative embodiment of the present invention, with reference to FIG. 7, the scintillation package assembly 212 includes the element 14, which is completely surrounded by the reflective tape 40. The element 14 is fit within a thin protective sleeve 150. The thickness of the sleeve 150 may be about 0.0015 inches. The sleeve 150 is preferably formed of stainless steel, but may be formed of any suitable metallic or non-metallic material. Suitable materials are those materials which are rugged, capable of providing protection and stable at elevated temperatures. Examples of materials from which the sleeve 150 may be formed include various metallic elements and/or compositions, laminate materials, composite materials, plastic, nylon, polymers of vinyl chloride, polymers of vinyl fluoride, fiberglass, and polyimide.

The sleeve 150 is bonded to a force distribution pad 160. The force distribution pad 160 may be formed of material which is capable of dispersing a concentrated force to prevent point loading on the element 14. One such material is SYLGARD®. The thickness of the force distribution pad 160 may be about 0.025 inches. The pad 160 may be of varying thickness, having one thickness under the spacers and a different thickness in the area between the spacers.

The combination of the protective sleeve 150 and the force distribution pad 160 provides radial shock absorption of a generalized nature, as well as protection against point loading. Spacers driven between the sleeve 150 and shield 30 compress the pad 160 to prevent motion of the crystal 114. Further, since both the sleeve 150 and the pad 160 are relatively thin, the element 114 can be enlarged, thus enhancing its efficiency.

Figure 8:
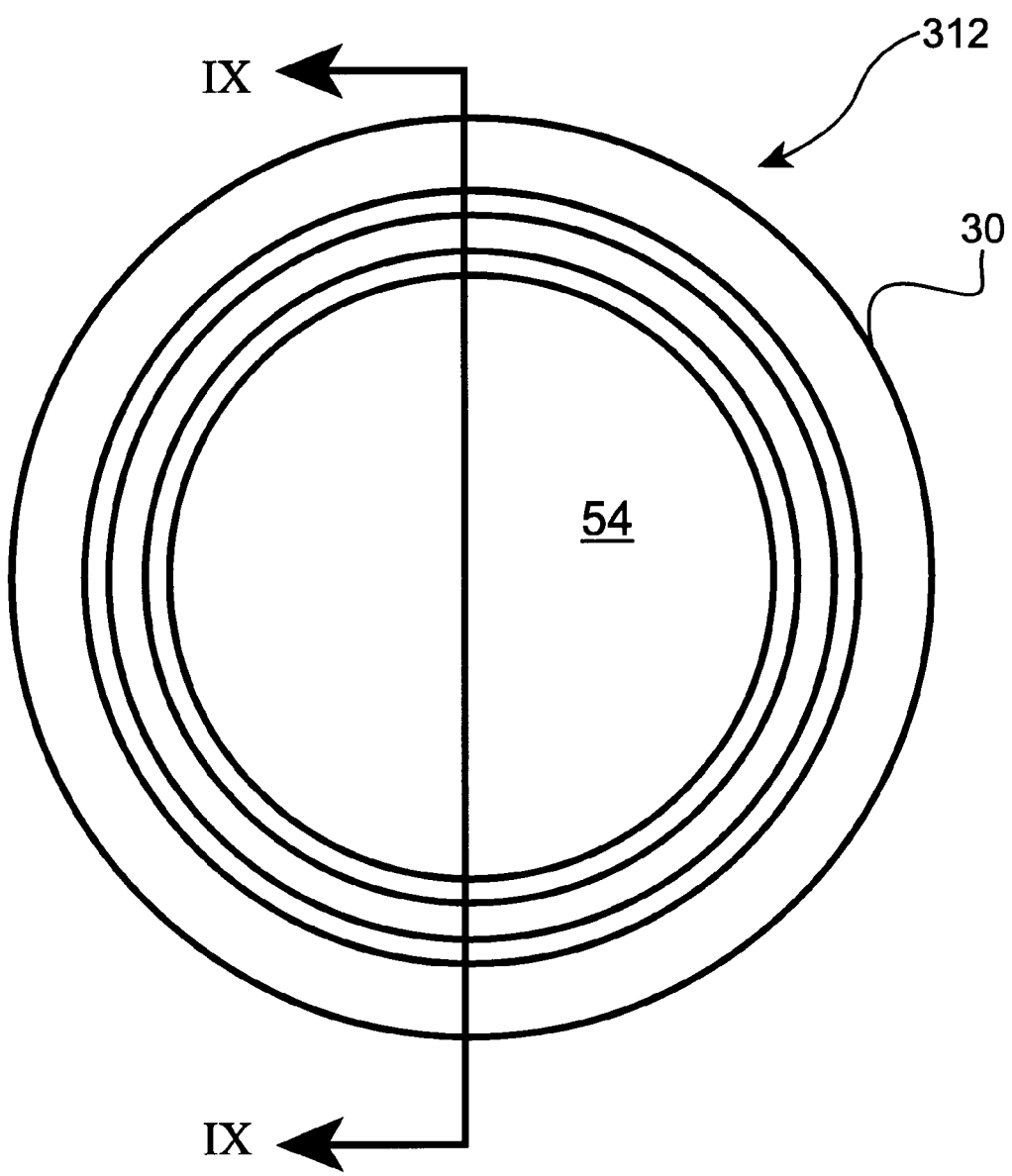
FIG. 8 is an end view of a scintillation package constructed in accordance with another preferred embodiment of the present invention.
Figure 9:
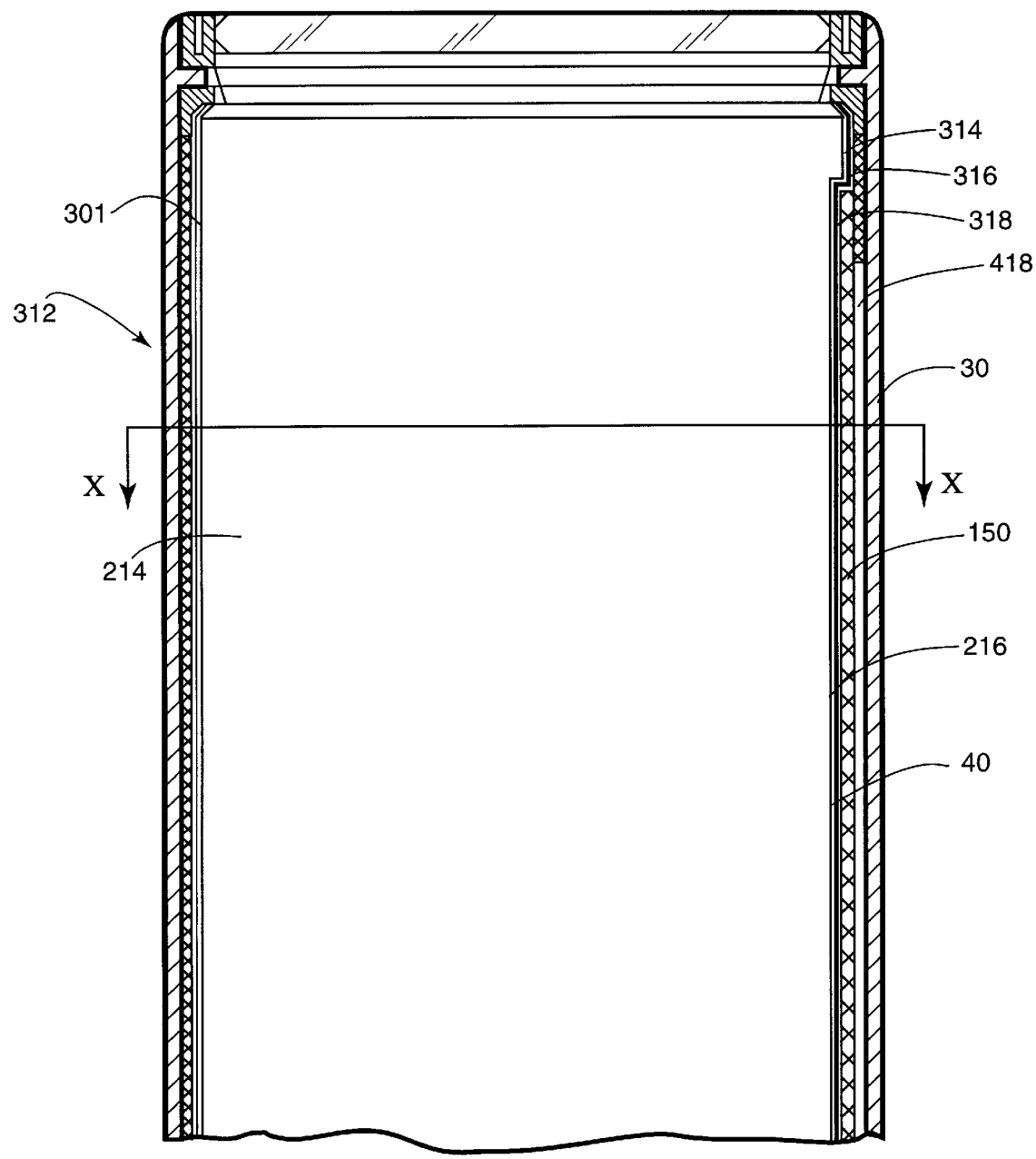
FIG. 9 is a partial cross-sectional view of the package of FIG. 8, taken along the line IX—IX.
Figure 10:
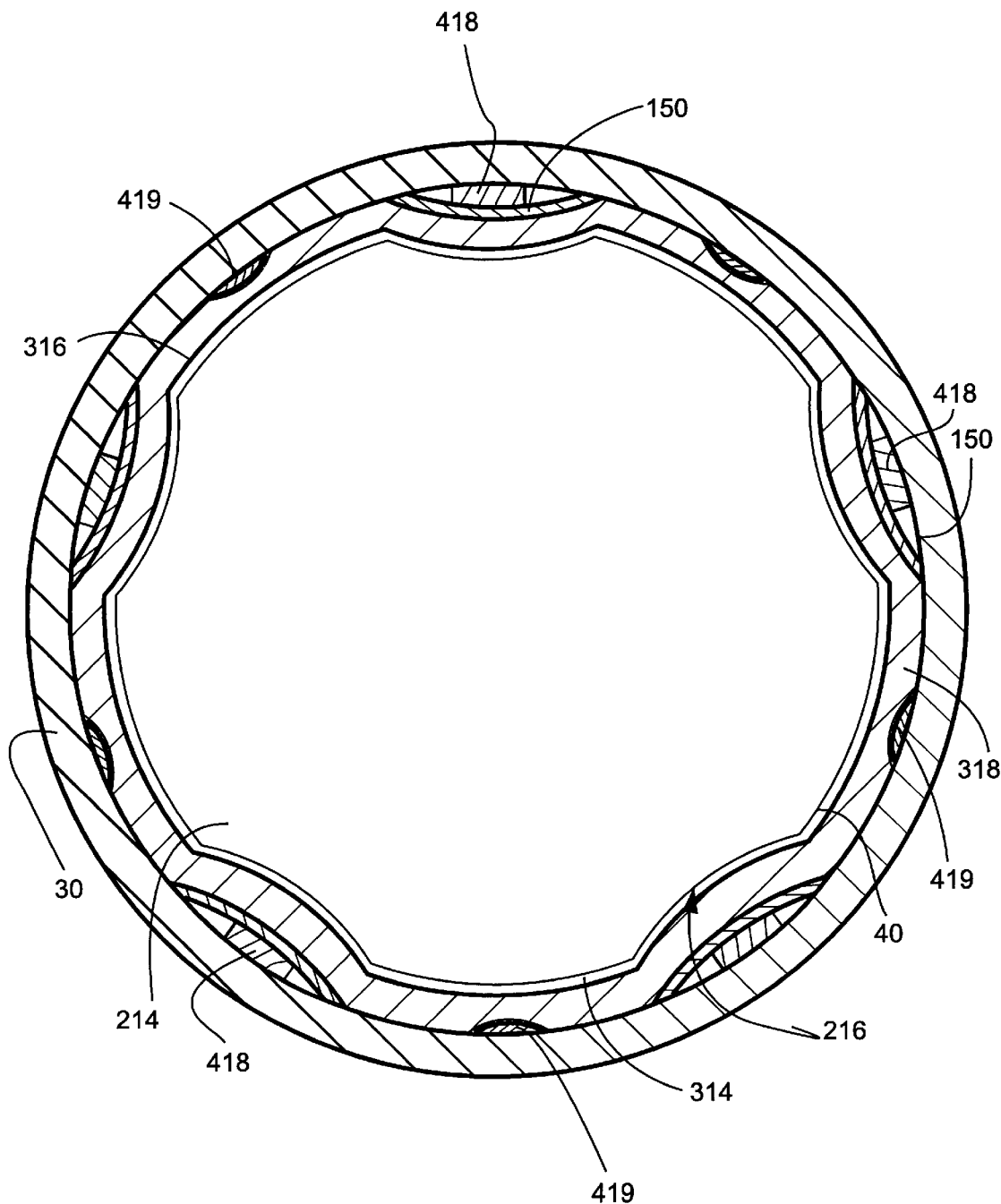
FIG. 10 is a cross-sectional view of the package of FIG. 8, taken along the line X—X.

A scintillation package 312 constructed in accordance with another preferred embodiment of the invention is illustrated in FIGS. 8–10, in which is shown a scintillation package 312. The package 312 includes an element 214 encased in a reflective tape 40. Surrounding the tape 40 is a Sidewall Axial Restraint and Compliance Assembly (SARCA) 301. The SARCA 301 includes an inner and an outer layer of material 314, 318, a third piece of material (not shown), a suitable bonding material to bond the layers 314, 318, and a grease layer 316. The layers 314, 318 are bonded together near one end, preferably with SYLGARD®, with a thin layer of the grease 316 therebetween on the remainder.

The grease 316 is located near the portion of the element 214 nearest the spring 408 and pad 410. The grease 316 helps prevent constraining axial forces from being transmitted from the shield 30, through the spring 408 and pad 410, through the layers 314, 318 and sleeve 150 to the element 214. However, the positioning of the grease 316 allows for thermal expansion of the element 214 at the end closest to the spring 408 and pad 410, while the opposite end of the element 214 is restrained by the SARCA so as to remain coupled to the window 54. In a preferred embodiment, the layer of grease 316 is about 0.001 inches thick. Axial restraining forces are transmitted through the front end (the end closest to the window) of the scintillation element 214 by the SARCA 301. Since the SARCA 301 and the springs 418 are very stiff in the axial direction this arrangement provides a high resonant frequency in the axial direction. Preferably, the resonant frequency of the element 214 within the scintillation package 312 is about 800 Hertz.

The layers 314, 318 are wrapped around the tape 40 and come together at a seam (not shown). To prevent the grease 316 from seeping through the seam and coming into contact with the tape 40, thus discoloring it, a third piece of material (not shown) is overlain on the seam.

In a preferred embodiment, the layer 314 is a thermally compliant sheath having a coefficient of thermal expansion near to that of the element 214. The layer 314 may be formed of a polyimide film, preferably an aluminized KAPTON® material, about 0.001 inches thick. Aluminized polyimide is highly reflective, thus enhancing the efficiency of transferring the light impulses from the element 214 to the photomultiplier tube 116. Further, aluminized polyimide adheres to the tape 40, and thus the layer 314 stays with the element 214 and has little or no propensity to slide relative to the element 214 or to pull or wear.

The other layer 318 is preferably formed of a material having a coefficient of thermal expansion near to that of the radial springs 418. In a preferred embodiment, the layer 318 is formed of an about 0.0015 inch thick stainless steel material. Alternatively, the layer 318 may be fabricated from a layer of 0.0015 inches thick aluminum that has been bonded to a 0.0015 inches thick layer of stainless steel. The bonding material may be SYLGARD®, which assists in giving the SARCA 301 an improved shape for installation. The layers 314, 318 may be bonded together along one-third or less of their length. The grease 316 may be applied to the remaining two-thirds or more of the layers 314, 318. In a preferred embodiment, the grease 316 is aluminized to provide reflectivity.

The thin protective sleeve 150 encapsulates the layers 314, 318 and the retaining tape 140. The tape 40, the bonded layers 314, 318, the layer of grease 316 and the sleeve 150 follow the outer contour of the element 214, including the grooves 216. The grooves 216 do not extend the full length of the element 214, but stop at a portion of the element 214 close to the window 54 (FIG. 9) in order to maintain a circular face on the element 214. All of these elements are then fit within the scintillation shield 30. From the end of the shield 30 opposite the end having the window 54, springs 418 are driven into the remaining void created by the grooves 216. Further, additional springs 419 are driven in from the end of the shield 30 opposite the end having the window 54 in between the shield 30 and the sleeve 150 at positions roughly equidistant between the grooves 216. The springs 419 are similar to the springs 418 but are less stiff. Although the grooves 216 are shown to stop at a portion of the element 214 close to the window 54, the grooves may extend the full length of the element 214.

The SARCA 301, which includes the combination of the tape 40, layers 314, 318, retaining tape 140 and sleeve 150, provides a stiff restraining force in the axial direction near the end of the element 214 closest to the window 54, assisting in preventing the element 214 from moving axially within the shield 30 away from the window 54. This stiff support produces a high resonant frequency in both the axial and radial directions. Concurrently, the SARCA 301 provides freedom of movement in the axial direction for the element 214 at the end closest to the axial springs 408, 410 to accommodate thermal expansion of the element 214.

The dynamic elements of the package 312 can be selected to optimize the dynamic and loading parameters, both axially and radially, for a given type application and for a given length-to-diameter ratio. A typical loading configuration for MWD would be a biasing force at the rear of the scintillation element 214 (or element 14, 114) that is one hundred and fifty times the weight of the element 214, with an additional axial restraining force of fifty times the weight being provided by the radial support system.

The loading in the radial direction for such a configuration would be approximately three hundred and twenty-five times the weight of the scintillation element 214, at ambient temperature, and less than five hundred times the weight of the scintillation element 214 at maximum temperature. Coatings may be applied to the SARCA 301 or the radial springs 418 in order to allow adjustment of the friction.

The capability of adjusting radial and axial preload forces and dynamic stiffness, provided by this invention, is crucial to providing optimal performance for a wide range of crystal package 312 sizes and shapes.

If extreme shock exceeds the restraint capability of the SARCA 301, the stiff axial support will restrain the movement so that the scintillation element 214 will not separate from the optical coupler (described below).

As the temperature of the element 214 changes, the layer 314, a thermally compliant sheath, will move with the element 214 and the tape 40. The layer 318, having a coefficient of thermal expansion near to that of the radial springs 418, remains fixed relative to the springs 418 while the element 214 expands or contracts due to temperature changes. The grease 316, which is placed between the layers 314, 318 near the end of the element 214 closest to the axial springs 408, 410, provides axial release to allow the element 214 to thermally expand in a direction away from the window 54, thus preventing the element 214 from applying excessive forces to the window 54 during thermal expansion.

The compressive forces of the radial springs 418 are transmitted radially inwardly. Near to the window 54, the compressive forces provide a high restraining force which helps to prevent decoupling of the element 214 from the window 54.

The spring 408 axially biases the element 214 toward the window 54 in ambient and sub-ambient temperatures. The elastomeric pad 410 provides a strong axial bias to the element 214 toward the window 54 in greater than ambient temperatures, generally during use. The pad 410, and to a lesser extent the spring 408, assist the SARCA 301 in providing an effective axial restraining force on the element 214.

To prevent the element 214 from slipping within the tape 40, which has a low coefficient of friction, the layers 314, 318, the sleeve 150 and the radial springs 418, in conjunction with the axial biasing of the spring 408 and the pad 410, provide a frictional restraining force on the element 214. The tape 40 is kept thin in the region where the restraining force is applied to element 214 so that the rough surface of the finished crystal 214 will be held through the tape 40 by the SARCA 301, which in turn is loaded by the radial springs 418. The added advantage of using thin tape 40 at this location near the front of the scintillation element 214 is to gain the advantage of the highly reflective aluminized polyimide which improves the pulse height resolution.

Prevention of axial movement of the element 214 (as well as elements 14 and 114) is important to prevent decoupling of the element 214 from the window 54. Any decoupling of the element 214 from the window 54 will cause greater noise. This arrangement is very stiff, which helps to keep a high resonant frequency.

In addition, the combination of the spring 408, the pad 410, the tape 40, the layers 314, 318 and the sleeve 150 allow for high biasing pressures to be put on the element 214 toward the window 54, while retaining thermal expansion room for the element 214.

The SARCA 301 may be utilized with most any size scintillation element and to a wide range of applications, and might be applied in a variety of ways not described in detail herein. In order to maximize volume of the element and to make the scintillation package more rugged, the use of radial springs 418, sapphire windows 54, bonded couplers with oil-retaining rings, titanium shields 30 and/or two-stage suspension systems are highly beneficial in combination with the use of a SARCA 301. Grooves in the scintillation element are useful for some detector configurations.

The characteristics of radial springs 418 are highly compatible with the attributes of the SARCA 301. The springs 418 provide firm support to the SARCA 301 but with sufficient freedom for required motion while the SARCA 301 transmits the forces from the springs 418 to the scintillation element at the desired location and in desired directions.

The use of sapphire windows 54 and two-stage axial suspension, such as spring 408 and pad 410, combine with the use of a SARCA 301 or grooves to increase the volume of the scintillation element by increasing both the length and the diameter of the element. The SARCA 301 is very thin, between about 0.006 inches and 0.010 inches, depending upon the specific scintillation element configuration. Radial springs 418 or radial spacers are also thin, in the range of 0.004 inches to 0.015 inches thick. A typical combination of SARCA 301 and radial springs 418 for a MWD detector will require approximately 0.010 to about 0.030 inches of space between the diameter of the reflective tape 40 around the scintillation element 14 and the inside diameter of the shield 30. Typically, this allows the scintillation element diameter to be approximately 0.100 inches to about 0.0170 inches larger than was previously possible for a MWD/LWD package.

Further, the use of sapphire windows 54 and two-stage axial suspension allows more space for longer scintillation elements than conventional configurations, typically 0.350 inches to 0.450 inches longer. Using these improvements, a 0.75 inches diameter by 3.0 inches long scintillation element can typically be increased to 0.875 inches diameter by 3.4 inches long without increasing the size of the package. This increases the cross-section of the scintillation element by over 25 percent and increases the volume about 50 percent. For larger scintillation element sizes, the relative increases may be less, and for smaller elements the relative increase will be greater. For the scintillation element embodiments illustrated in FIGS. 4–6 and 9–10, a small amount of the scintillation element 114 (on the order of about one to about five percent) is removed in order to create the flats 116 or grooves 216.

In some instances, the SARCA 301 is not essential to the use of the grooves 216 in order to achieve proper dynamic support or thermal compliance and removal of the SARCA 301 allows a very small increase in the diameter of the scintillation element 214. Short scintillation elements, less than about three inches, are more likely to benefit from the use of grooves 216 without the use of a SARCA 301 than are longer elements. The thermal compliance provided by the SARCA 301 is very important for longer elements.

Figure 11:
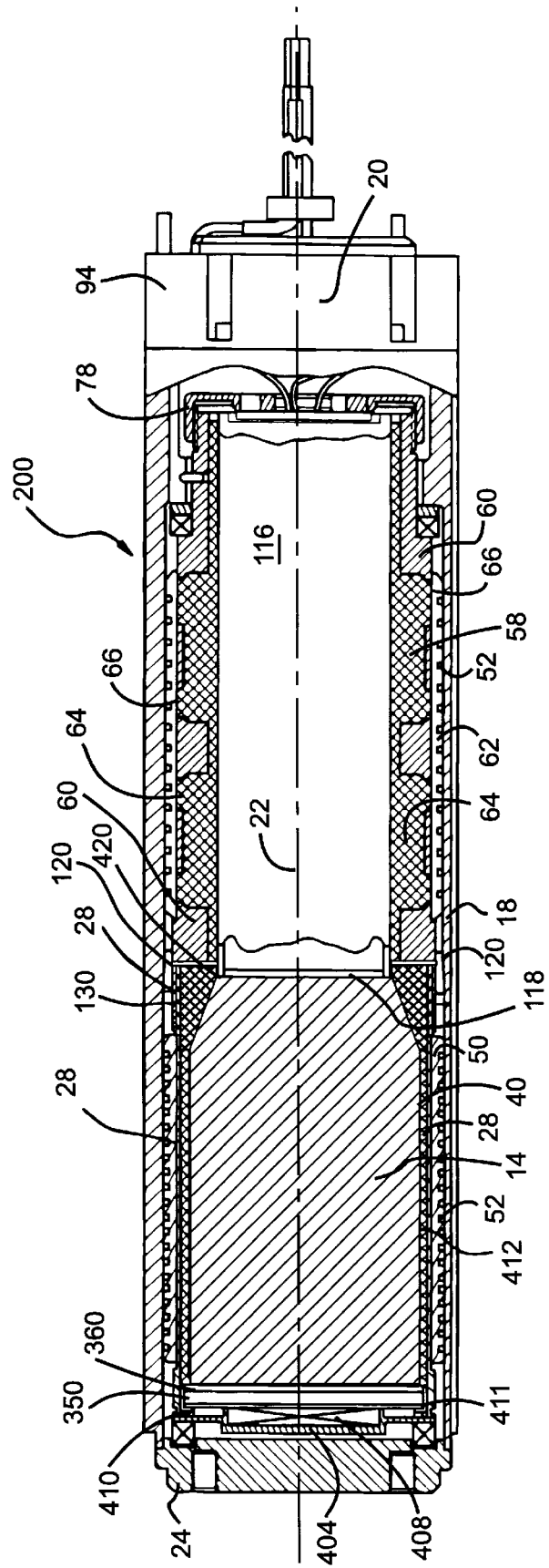
FIG. 11 is a partial cross-sectional view of a radiation detector assembly constructed in accordance with another preferred embodiment of the present invention.

A radiation detector assembly 200 constructed in accordance with another preferred embodiment of the invention is illustrated in FIG. 11. Components of the detector assembly 200 include a scintillation package 412 and a photomultiplier tube 116.

The photomultiplier tube 116 may be similar in many respects to the photomultiplier tube 16. Both tubes could be roughly similar in length, weight and light detecting and quantifying capability. However, tube 116 includes a flange 120 projecting radially outwardly from an outer circumference thereof. Other light detecting and quantifying means, such as photodiodes, could be used so long as the housing containing the faceplate and the flange are hermetic.

The scintillation package 412 includes element 14. Although element 14 is illustrated, it is to be understood that the invention is not limited to the illustrated embodiments and is to include within its scope elements 114 and 214, as well as other suitable radiation detecting means. Element 14 is housed within a shield 130, which is similar to shield 30. The difference between shield 30 and shield 130 is that shield 130 is longer and extends beyond the element 14. The scintillation package 412 includes the spring 408 and pad 410, and may further include the SARCA 301.

An optical coupler 420, made from a transparent elastomeric material, is positioned at the end of the element 14 opposite the spring 408. This is to provide optical coupling directly between the element 14 and the faceplate 118 of the photomultiplier tube 116. The faceplate 118 may be made of any suitable material, such as glass or sapphire.

The package 412 is designed such that when positioned within the housing 18, the open end of the shield 130 abuts the flange 120 and the element 14 is optically coupled, through the optical coupler 420, with the faceplate 118. The shield 130 is attached to the flange 120 by any suitable method, preferably by welding, in order to rigidly attach the photomultiplier tube 116 to the scintillation package 412.

Through this arrangement, the element 14 may be optically coupled directly to the faceplate 118 of the photomultiplier tube 116. Further, since a window and further optical coupling (between the window and the photomultiplier tube) are no longer necessary, the element 14 may be elongated, hence increasing the volume of the element 14. Having the faceplate 118 closer to the scintillation element 14 also improves the performance of the detector. This arrangement is possible in instances where there is no requirement to be able to replace the photomultiplier tube in the field. Where it is necessary to replace the photomultiplier tube, separating the element 14 from the photomultiplier tube 116 must be done in a controlled environment to keep moisture from the element 14.

Figure 12:
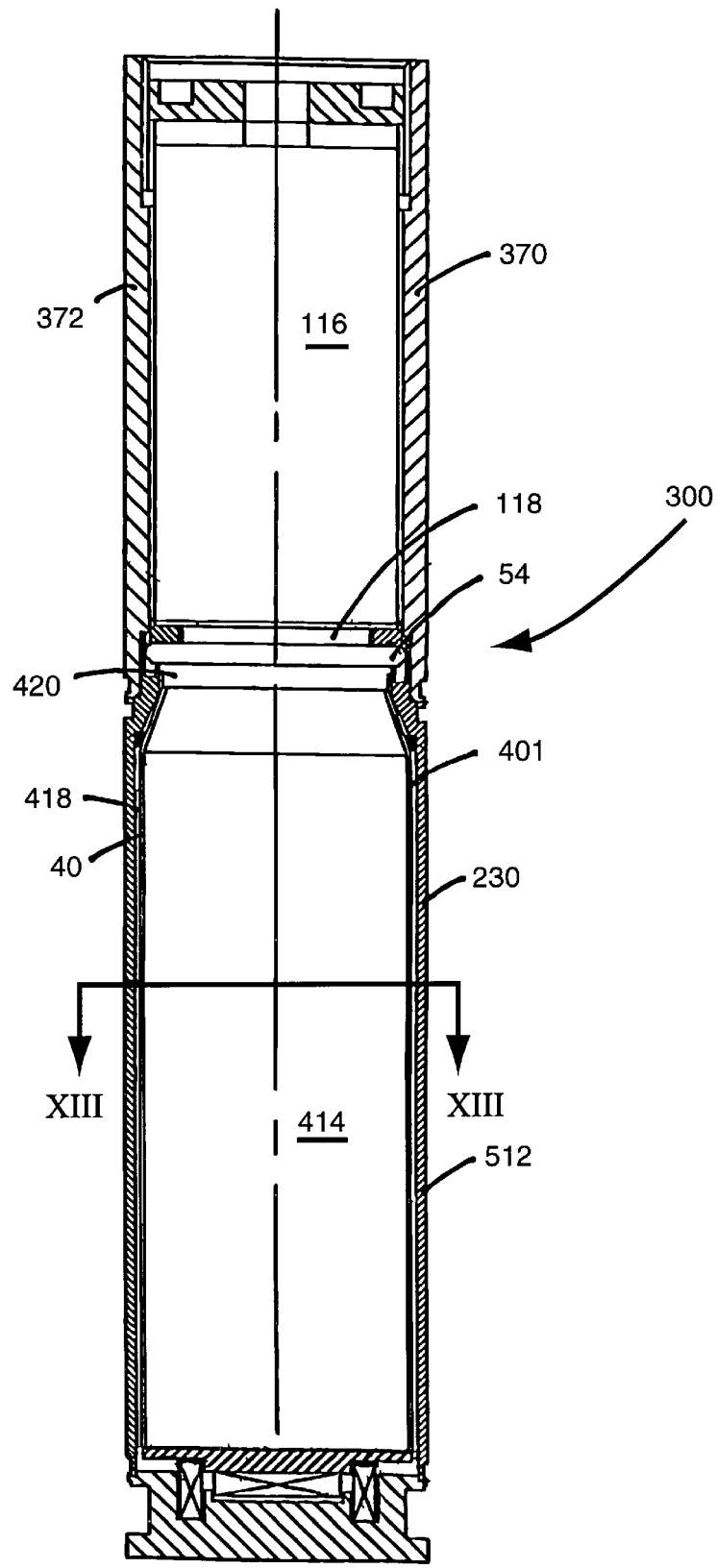
FIG. 12 is a partial cross-sectional view of a radiation detector assembly constructed in accordance with another preferred embodiment of the present invention.
Figure 13:
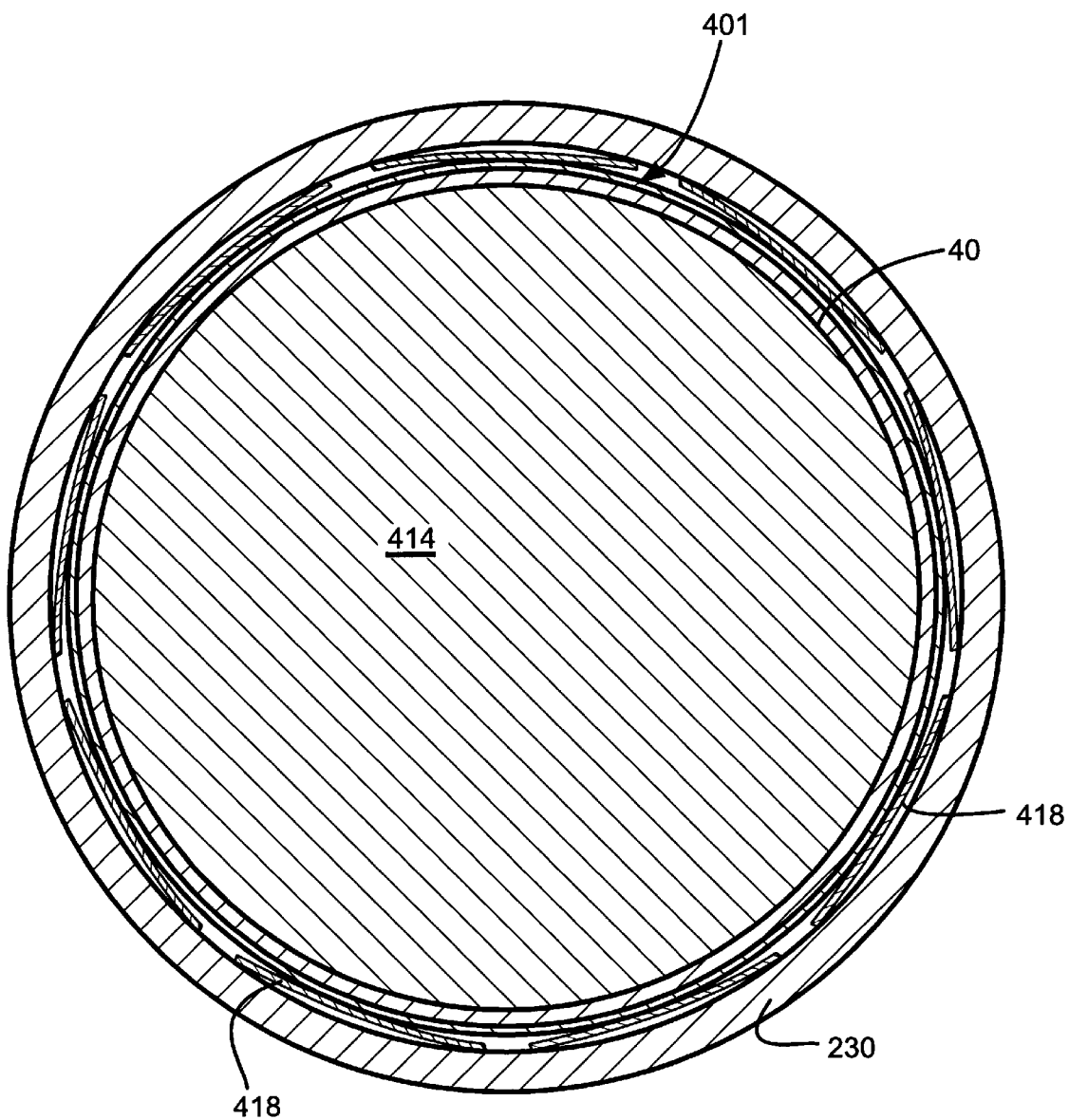
FIG. 13 is a cross-sectional view of a scintillation package of FIG. 12, taken along the line XIII—XIII.

A radiation detector assembly 300 constructed in accordance with another preferred embodiment of the invention is illustrated in FIGS. 12–13. The detector assembly 300 includes a photomultiplier tube assembly 370, including a photomultiplier tube housing 372 surrounding the photomultiplier tube 116. The photomultiplier tube 116 has a faceplate 118.

Further included in the detector assembly 300 is a scintillation package 512. The package 512 includes a scintillation shield 230, an end of which is attached by suitable means, such as welding, to an end of the photomultiplier tube housing 372. An element 414 is positioned within the shield 230. Element 414 is similar to element 14, only possessing greater volume than element 14. At one end of the element 414 is positioned the optical coupler 420. At an opposite end, a two-stage biasing assembly, such as the spring 408 and the pad 410, is positioned so as to provide axial stiffness to the scintillation package 512 and to axially bias the element 414 toward the window 54, which is positioned between the faceplate 118 and the optical coupler 420.

Surrounding the element 414 within the shield 230 is the reflective tape 40, which is surrounded by a SARCA 401, an alternative embodiment of the SARCA 301. The SARCA 401 (more fully shown in FIG. 16) includes, moving radially outwardly from the element 414, a barrier layer 376, a thermally compliant layer 374, an aluminum foil layer 318, and the protective sleeve 150. Preferably, the sleeve 150 is formed of number 304 stainless steel.

A bonding material 519 is applied between the bond layer 374 and the foil layer 318, and between the foil layer 318 and the sleeve 150. The bonding material 519 is introduced between the layers 374 and 318 and the layer 318 and the sleeve 150 at the end closest to the window 54 and extends no greater than one inch, and preferably not more than one-half of one inch.

As in the SARCA 301, a grease layer 316 is provided between the thermally compliant layer 374 and the foil layer 318 at the end of the element 414 nearest to the two-stage axially biasing means so as to allow thermal expansion of the element 414 in a direction away from the window 54.

The barrier layer 376 adheres to the reflective tape 40 and also prevents the grease 316 from coming into contact with the reflective tape 40. Both the barrier and the thermally compliant layers 376, 374 are preferably formed of a material which slides poorly when in contact with itself, such as aluminized polyimide. At the end of the scintillation package 512 closest to the window 54 the barrier layer 376 adheres to the element 414 and reflective tape. The barrier layer 376 itself adheres to the thermally compliant layer 374 due to friction between the layers 376, 374. Further, the layer 374 is bonded to the foil layer 318, which is itself bonded to the sleeve 150.

Positioned between the sleeve 150 of the SARCA 401 and the shield 230 are a plurality of radial springs 418. The springs 418 complement the two-stage biasing means to provide radial stiffness to the scintillation package 512. More specifically, the springs 418 provide stiffness in both the radial and axial directions. If the friction between the radial springs 418 and the SARCA 401 is exceeded by shock forces, the axial stiffness provided by the spring 408 and the pad 410, or like biasing means, combines with the stiffness of the radial springs 418 to create an effective dynamic stiffness to the package 512 such that a high resonant frequency is maintained and noise is diminished.

The springs 418 supply sufficient stiffness to the package 512 in the radial direction that a cushioning means, such as potting material or an elastomeric boot or other similar material, is rendered unnecessary. Because the need for cushioning means is eliminated, the element 414 can be enlarged to take up the space previously occupied by such cushioning means.

The springs 418 are sized and shaped so as to provide the desired stiffness, force and friction to the radiation detector assembly. More specifically, the width, thickness and material type of the springs 418 may all be varied to adjust the stiffness provided to the assembly. Variations in the stiffness will also change the force, and friction changes proportionally with changes in force.

Figure 14:
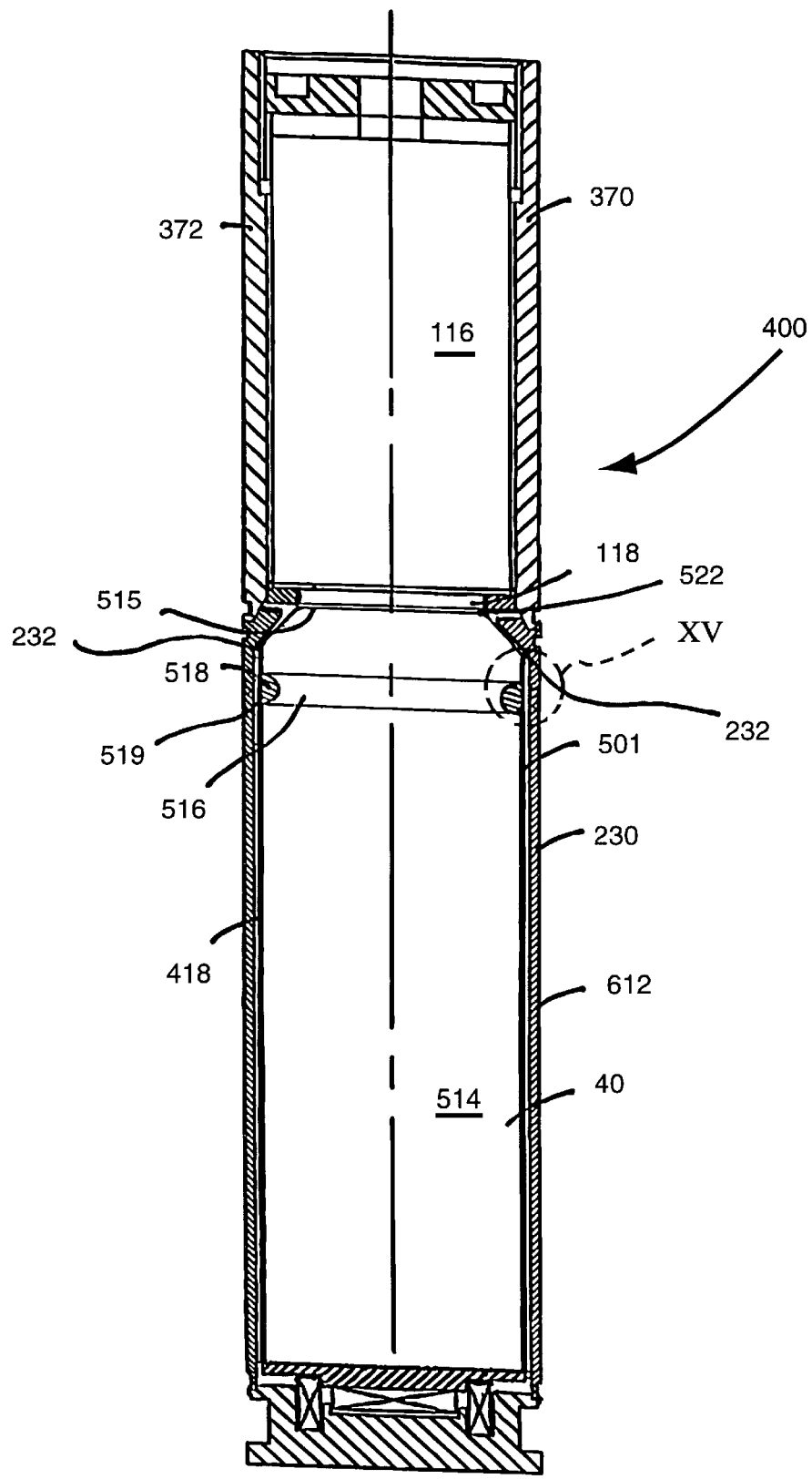
FIG. 14 is a partial cross-sectional view of a radiation detector assembly constructed in accordance with another preferred embodiment of the present invention.
Figure 15:
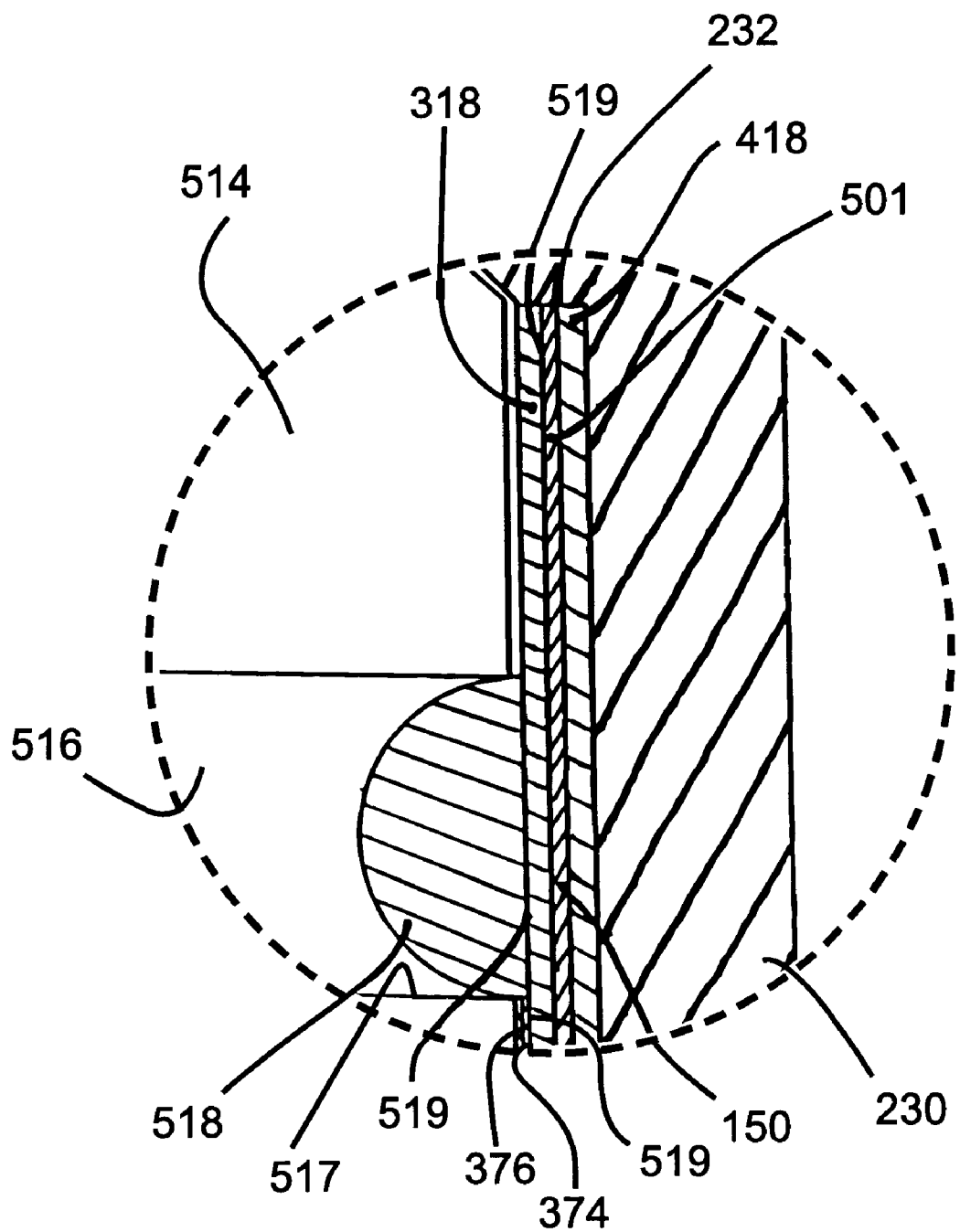
FIG. 15 is an enlarged view of the ridge shown in circle XV of FIG. 14.

A radiation detector assembly 400 constructed in accordance with another preferred embodiment of the invention is illustrated in FIGS. 14–15. The detector assembly 400 includes the photomultiplier tube assembly 370, including the photomultiplier tube 116, housing 372 and the faceplate 118, and a scintillation package 612, which includes the shield 230, the springs 418, a SARCA 501, reflective tape 40 and a scintillation element 514. Like the detector assembly 200, the detector assembly 400 lacks a window 54.

Unlike the detector assembly 200, the element 514 is not coupled to the faceplate 118. Instead, an end 515 of the element 514 is positioned such that there is a void space 522 between the element end 515 and the faceplate 118. The void space 522 between the end 515 and the faceplate 118 is preferably about 0.025 inches.

A biasing means is shown in FIG. 14 positioned at the other end of the element 514 to provide, along with the SARCA 501 and the radial springs 418, an effective dynamic stiffness to the package 612. However, means are required to prevent the biasing force from the biasing means to close the void space 522. Further, since the element 514 is not pressed against a load bearing optical coupler, the two-stage biasing means is not required to bias the element 514.

The biasing means is, however, used to hold the SARCA 501 in position. Specifically, the spring 408 is positioned between an end cap 235 and the SARCA 501. The spring 408 biases the SARCA 501 against a ledge 232 of the shield 230. The SARCA 501 and the radial springs 418 perform the function of providing stiff support in both the radial and axial directions, in a manner similar to previously discussed embodiments.

At a portion of the element 514 near the end 515 is positioned a radial groove 516 traversing the circumference of the element 514. A ring 518 fits within the groove 516 so as to come into contact with the foil layer 318. The SARCA 501 is similar to the SARCA 401, except that in the SARCA 501, the barrier and thermally compliant layers 376, 374 are positioned to stop at the lower edge 517 of the groove 516 instead of continuing on with the layer 318 and the protective sleeve 150.

Depending on the frictional force between the ring 518 and the foil layer 318, a bonding material 519, such as SYLGARD® may be placed therebetween. In an alternative embodiment employing materials which produce a strong enough frictional force between them to counteract the biasing force due to the two-stage biasing means, no bonding material 519 may be used to bond the ring 518 to the layer 318. Further, although the ring 518 is shown directly adjacent the layer 318, the ring 518 may instead be adjacent to the protective sleeve 150. In such an instance, the layer 318 stops approximately where the layers 374, 376 stop. In addition, the ring 518 may be bonded to or formed as part of the sleeve 150.

As in the SARCA 401, the bonding material 519 is also placed between the foil layer 318 and the thermally compliant layer 374 and between the foil layer 318 and the sleeve 150. The length of bonding between the foil layer 318, the thermally compliant layer 374, and the sleeve 150 is preferably no more than one inch.

By removing the optical coupler 420, in addition to the window 54, an even greater increase in the length of scintillation element 514 is possible. The length of the element 514 may be extended to near the faceplate 118 of the photomultiplier tube 116. Although light transfer will be attenuated without the coupler 420, in some instances this loss of light output is not a serious detriment to the performance of the detector. This is particularly true where the photomultiplier tube 116, or other light detecting and quantifying device, is being actively cooled or being kept cool, such that the reduction of heat transfer from the element to the photomultiplier tube 116 is more valuable than the loss of optical performance.

Further, a thin wafer of transparent material such as sapphire, which has been coated with an ultra-violet coating, can be affixed to the front of the element 514 so as to minimize the loss of light due to reflection at the interface between the element 514 and gas or vacuum.

Alternatively, a non-load bearing optical coupling material may be affixed to the front of the element 514. Such a material may be moldable and stretchable with a high elastic memory, such as Wacker®.

Figure 16:
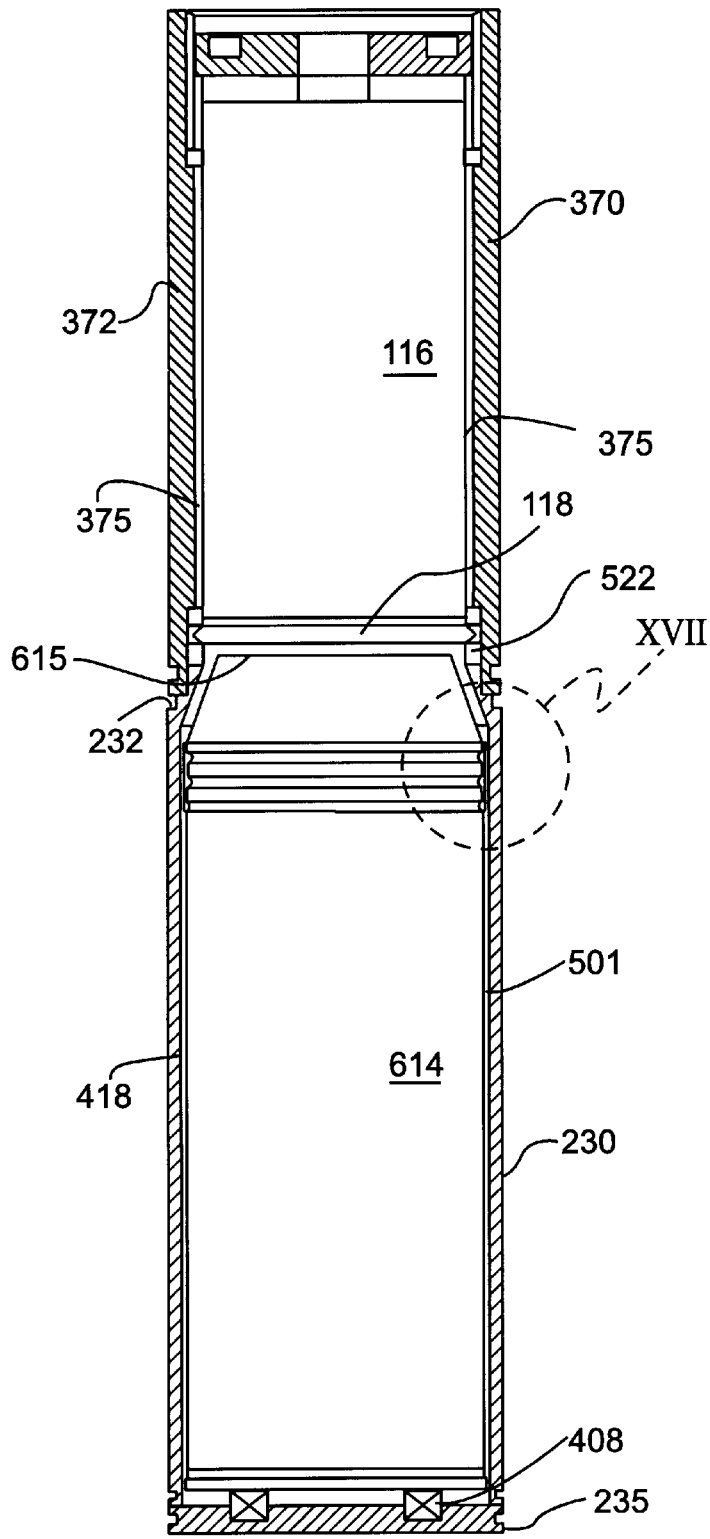
FIG. 16 is a partial cross-sectional view of a radiation detector assembly constructed in accordance with another preferred embodiment of the present invention.

Although a single radial groove 516 and ring 518 is illustrated in FIGS. 14, 15, a plurality of such groove/ring assemblies may be created along the length of a scintillation element 614, as shown in FIGS. 16, 17. In such an arrangement, the plurality of the groove/ring assemblies 616, 618 are preferably formed closer to the front end of the element 614 (closest to the faceplate 118). The rings 618 are bonded to the SARCA 501 by way of a bonding material 619, which is similar to the bonding material 519. Further, the SARCA 501 is biased by the spring 408 toward the ledge 232 of the shield 230. In this way, the element 614 can be restrained at the front end, while still allowing for thermal expansion of the element 614 at its back end (closest to the spring 408).

A significant advantage of this configuration is that the length of the scintillation element 614 can be almost as long as the shield 230, since only the length of one small spring (spring 408) separates the scintillation element 614 from the end of the shield 230. Preferably, the spring 408 is 0.030 inches thick and the end cap 235 is 0.030 inches thick. By using a spring and an end cap which are both 0.030 inches in thickness, the scintillation element 614 may be only about 0.1 inches shorter than the distance between the faceplate 118 of the photomultiplier tube 116 and the end cap 235. This compares to an industry standard of 0.65 inches to more than one inch.

Referring now to FIG. 16, surrounding the photomultiplier tube 116 are a plurality of radial springs 375, which are similar to the radial springs 418. As the radial springs 418 do for the scintillation element 614, the radial springs 375 support to the photomultiplier tube 116 by providing a high resonant frequency. The radial springs 375 make unnecessary the use of the elastomeric material 58, hence allowing for a larger sized photomultiplier tube 116 to accommodate the larger element 614. A larger photomultiplier tube 116 is necessary to fully maximize the efficiency of scintillation packages having larger diameter scintillation elements and large windows.

Figure 18:
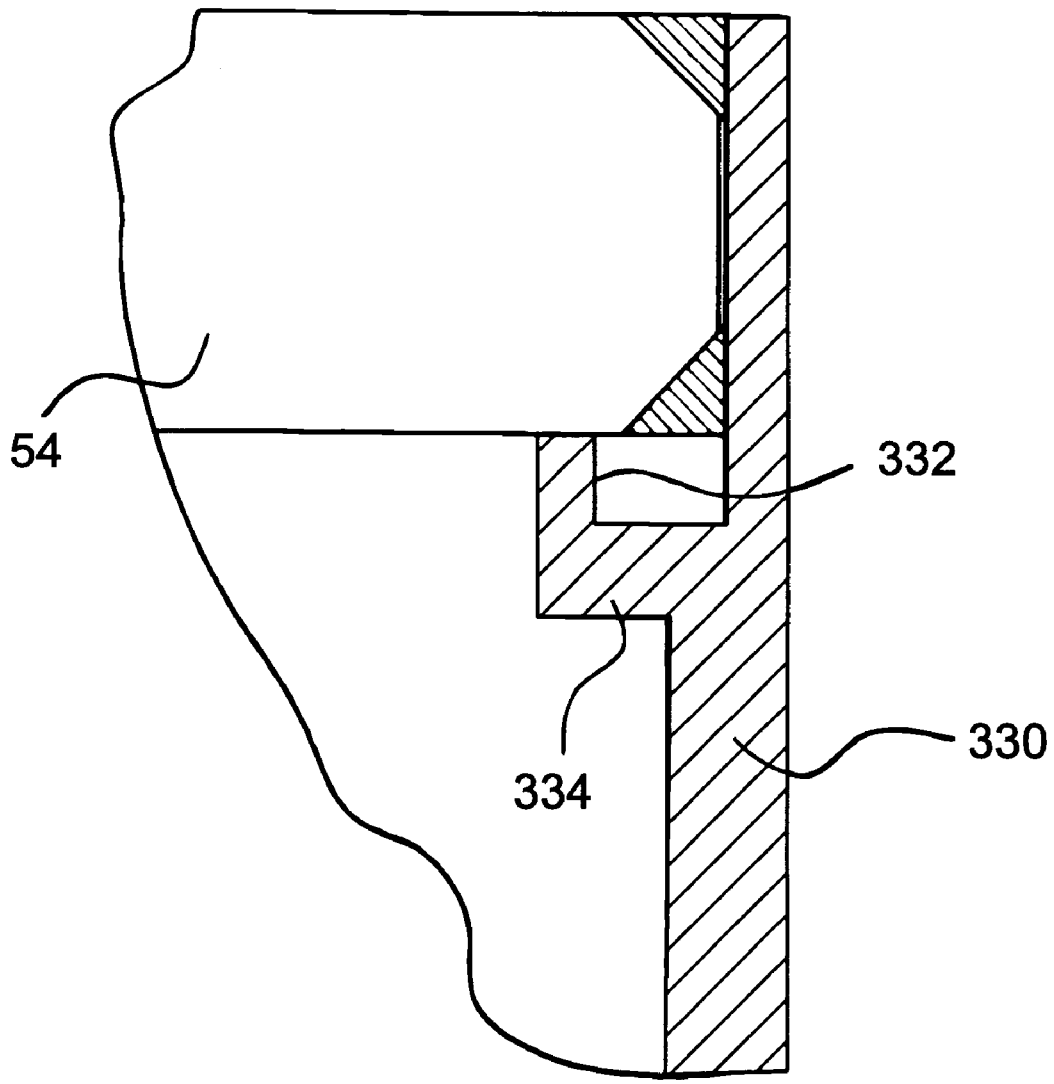
FIG. 18 is partial cross-sectional view of a window assembly constructed in accordance with another preferred embodiment of the present invention.

Another preferred embodiment of the invention is illustrated in FIG. 18. In this embodiment, the sapphire window 54 is brazed directly to scintillation shield 330, which is formed of titanium. The shield 330 includes a stanchion 332 and a stanchion base 334.

The window 54 is placed upon the shield stanchion 332 with a braze material around the periphery of the window 54. The shield 330 and window 54 are then placed in an oven, which melts the braze material, thus brazing the window 54 to the shield 330.

The advantage to the arrangement illustrated in FIG. 18 is that it allows a window aperture larger than the element 14, which allows for maximum transmission of light from the element. A larger diameter window is necessary to take full advantage and benefit of larger scintillation elements.

The maximum possible scintillation element diameter is achieved when the element and its reflective tape 40 are increased to the point that they are the same diameter as the inside diameter of the shield at maximum operating temperature. The various arrangements to obtain or nearly obtain a maximum scintillation element diameter have been discussed above. In order to take full advantage of such maximized element diameters, the window 54 must be also maximized, as illustrated in FIG. 18.

The above description and drawings are only illustrative of certain preferred versions which achieve the objects, features and advantages of the present invention. It is not intended that the present invention be limited to these versions. For example, while flats 116 and grooves 216 are illustrated as being parallel to the longitudinal axis of the element 114, the flats or grooves may be oriented in a helical fashion, or other arrangements which allow a greater sized element to be placed in a standardized radiation detector housing.

What is claimed as new and desired to be protected by Letters Patent of the United States is:

1. A scintillation element for receiving radiation and transforming the radiation into light impulses, said element being generally cylindrical, having a circumference and a longitudinal axis, and having non-cylindrical portions extending along said circumference.

2. The scintillation element of claim 1, wherein said non-cylindrical portions extend parallel to said longitudinal axis.

3. The scintillation element of claim 2, wherein said non-cylindrical portions are grooves.

4. A scintillation package comprising:
   a scintillation element for receiving radiation and transforming the radiation into light impulses, said element being generally cylindrical, having a circumference and a longitudinal axis, and having non-cylindrical portions extending along said circumference;
   reflective material for reflecting the light impulses, wherein said material surrounds said element;
   elastomeric material for providing shock absorption for said element, said elastomeric material being positioned along said non-cylindrical portions; and
   a scintillation shield surrounding said reflective material and said elastomeric material.

5. The scintillation package of claim 4, wherein said reflective material is tape.

6. The scintillation package of claim 4, further comprising radial springs positioned between said element and said shield.

7. The scintillation package of claim 6, wherein said radial springs are positioned within said non-cylindrical portions.

8. The scintillation package of claim 7, wherein said non-cylindrical portions extend parallel to the longitudinal axis.

9. The scintillation package of claim 4, wherein said non-cylindrical portions are grooves.

10. The scintillation package of claim 4, further comprising a two-stage axial biasing and expansion means positioned at an end of said scintillation element for providing a biasing force on said element and for allowing expansion of said element.

11. The scintillation package of claim 10, wherein said two-stage axial biasing and expansion means includes an axial spring and an elastomeric pad, said elastomeric pad being offset from said axial spring.

12. The scintillation package of claim 4, further comprising an optical window positioned at a second end of said element.

13. The scintillation package of claim 12, wherein said optical window is formed of sapphire.

14. The scintillation package of claim 13, wherein said optical window is attached directly to said scintillation shield.

15. A scintillation package comprising:
a scintillation element for generating light impulses;
reflective material for reflecting the light impulses, wherein said material surrounds said element;
a thermally compliant material adapted to allow movement of a portion of said element due to thermal expansion of said element, said compliant material surrounding said reflective material;
a protective sleeve surrounding said compliant material;
a scintillation shield surrounding said sleeve; and
springs positioned between said sleeve and said shield.

16. The scintillation package of claim 15, wherein said scintillation element is generally cylindrical, has a longitudinal axis, and has non-cylindrical portions which extend along the circumference of said element.

17. The scintillation package of claim 16, wherein each of said springs is positioned along said non-cylindrical portions.

18. The scintillation package of claim 17, further including elastomeric material positioned along said non-cylindrical portions.

19. The scintillation package of claim 18, wherein said non-cylindrical portions are grooves.

20. The scintillation package of claim 15, further comprising an optical window positioned at an end of said element.

21. The scintillation package of claim 20, wherein said optical window is formed of sapphire.

22. The scintillation package of claim 21, wherein said optical window is attached directly to said shield.

23. The scintillation package of claim 15, further comprising a layer of foil positioned between said compliant material and said sleeve.

24. The scintillation package of claim 23, further comprising a layer of grease positioned between said compliant material and said layer of foil.

25. The scintillation package of claim 15, further comprising a layer of grease positioned between said compliant layer and said sleeve.

26. The scintillation package of claim 25, including a layer of barrier material positioned between said reflective material and said compliant material.

27. The scintillation package of claim 15, further comprising a two-stage axial biasing and expansion means positioned at an end of said scintillation element for providing a biasing force on said element and for allowing expansion of said element.

28. The scintillation package of claim 27, wherein said two-stage axial biasing and expansion means includes two axial springs, with one said spring being offset from the other said spring.

29. The scintillation package of claim 15, including at least one ring adapted to axially restrain said element, said element including at least one circumferentially extending groove into which said at least one ring is received.

30. The scintillation package of claim 29, wherein said at least one ring is bonded to said sleeve.

31. The scintillation package of claim 15, including an optical coupler positioned at an end of said element.

32. The scintillation package of claim 31, wherein said coupler is formed of a non-load bearing material.

33. The scintillation package of claim 15, wherein said reflective material is tape.

34. The scintillation package of claim 15, wherein said compliant material and said protective sleeve are bonded together.

35. The scintillation package of claim 15, wherein said element has a resonant frequency within the package of no less than about eight hundred Hertz.

36. A scintillation package comprising:
a scintillation element for generating light impulses;
reflective material for reflecting the light impulses, wherein said material surrounds said element;
a force distribution pad surrounding said reflective material;
a protective sleeve surrounding said force distribution pad; and
a scintillation shield surrounding said sleeve; and a plurality of axially extending radial springs between said protective sleeve and said scintillation element, said radial springs extending along a substantial portion of the length of said scintillation element.

37. The scintillation package of claim 36, wherein said reflective material is tape.

38. The scintillation package of claim 36, wherein said force distribution pad is bonded to said sleeve, said force distribution pad being formed of an elastomer.

39. A radiation detector assembly comprising:
a scintillation package including:
a scintillation element for generating light impulses, said element having an end;
reflective material for reflecting the light impulses, wherein said material surrounds said element;
a thermally compliant material adapted to allow movement of a portion of said element due to thermal expansion of said element, said compliant material surrounding said reflective material;
a protective sleeve surrounding said thermally compliant material;
a scintillation shield surrounding said element; and
springs positioned between said sleeve and said shield;
a photomultiplier tube for receiving and quantifying the light impulses from said element, said photomultiplier tube positioned at said end of said element; and
a photomultiplier tube housing surrounding said photomultiplier tube.

40. The radiation detector assembly of claim 39, including an optical window positioned between said end of said element and said photomultiplier tube.

41. The radiation detector assembly of claim 40, wherein said optical window is formed of sapphire.

42. The scintillation package of claim 41, wherein said optical window is attached directly to said scintillation shield.

43. The radiation detector assembly of claim 40, including an optical coupler positioned between said element and said optical window.

44. The radiation detector assembly of claim 39, wherein said photomultiplier tube has a faceplate at an end thereof.

45. The radiation detector assembly of claim 44, wherein said scintillation package includes an optical coupler positioned between said element and said photomultiplier faceplate.

46. The radiation detector assembly of claim 45, wherein said coupler is formed of a non-load bearing material.

47. The radiation detector assembly of claim 45, wherein said optical coupler is in physical contact with said faceplate and said element.

48. The radiation detector assembly of claim 44, wherein said faceplate is spaced apart from said element.

49. The radiation detector assembly of claim 44, wherein said scintillation package includes at least one ring adapted to axially restrain said element, said element including at least one circumferentially extending groove into which said at least one ring is received.

50. The radiation detector assembly of claim 49, wherein said at least one ring is bonded to said sleeve.

51. The radiation detector assembly of claim 39, wherein said scintillation package further comprises a two-stage axial biasing and expansion means positioned at a second end of said element to provide axial support to said element and to bias said element toward said photomultiplier tube.

52. The radiation detector assembly of claim 51, wherein said two-stage axial biasing and expansion means includes two springs, with one said spring being offset from the other said spring.

53. The radiation detector assembly of claim 39, wherein said reflective material is tape.

54. The radiation detector assembly of claim 39, wherein said element is generally cylindrical, has a longitudinal axis, and has non-cylindrical portions extending along the circumference of said element.

55. The radiation detector assembly of claim 39, including a layer of barrier material positioned between said tape and said compliant material.

56. The radiation detector assembly of claim 39, wherein said element has a resonant frequency within said package of no less than about eight hundred Hertz.

57. The radiation detector assembly of claim 39, further comprising springs positioned between said photomultiplier tube and said photomultiplier tube housing.

58. A scintillation package comprising:

a housing;

a scintillation element for receiving radiation and transforming the radiation into light impulses, said scintillation element being generally cylindrical, having a circumference and a longitudinal axis, said scintillation element received within said housing; and a plurality of axially extending radial springs positioned between said scintillation element and said housing; extending along a substantial portion of the length of said scintillation element.

59. The scintillation package of claim 58 wherein said scintillation element is wrapped with reflective tape and wherein said radial springs are positioned between said reflective tape and said housing.

60. The scintillation package of claim 59 wherein elastomeric material surrounds said tape and wherein said radial springs are positioned between said elastomeric material and said housing.

61. The scintillation package of claim 60 and further including an open-ended cylindrical shield located radially outside said radial springs and radially inside said housing.

62. The scintillation package of claim 58 wherein said radial springs each comprise elongated strips of flat spring steel.

63. The scintillation package of claim 58 wherein each spring is arched in a width direction.

64. The scintillation package of claim 58 wherein said scintillation element has a plurality of non-cylindrical portions extending axially along said element at circumferentially spaced regions thereof, and wherein said radial springs are positioned within respective non-cylindrical portions.

65. The scintillation package of claim 64 wherein non-cylindrical portions comprise flat surfaces.

66. The scintillation package of claim 64 wherein said non-cylindrical portions comprise grooves.

\* \* \* \* \*